United States Patent
Mao et al.

(10) Patent No.: US 11,912,896 B2
(45) Date of Patent: Feb. 27, 2024

(54) ENVIRONMENT-FRIENDLY FIRE-RETARDANT COATING AND PREPARATION METHOD THEREOF

(71) Applicant: ZHEJIANG MINGNUO NEW MATERIAL TECHNOLOGY CO., LTD, Huzhou (CN)

(72) Inventors: Han Mao, Huzhou (CN); Hong Chen, Huzhou (CN); Jingyuan Wu, Huzhou (CN)

(73) Assignee: ZHEJIANG MINGNUO NEW MATERIAL TECHNOLOGY CO., LTD, Huzhou (CN)

( * ) Notice: Subject to any disclaimer, the term of this patent is extended or adjusted under 35 U.S.C. 154(b) by 0 days.

(21) Appl. No.: 18/455,641

(22) Filed: Aug. 25, 2023

(65) Prior Publication Data
US 2023/0407108 A1   Dec. 21, 2023

Related U.S. Application Data

(63) Continuation of application No. PCT/CN2023/097745, filed on Jun. 1, 2023.

(30) Foreign Application Priority Data

Jun. 15, 2022   (CN) .......................... 202210673741.0

(51) Int. Cl.
   *C09D 5/18*   (2006.01)
   *A62D 1/00*   (2006.01)
   (Continued)

(52) U.S. Cl.
   CPC ............. *C09D 5/18* (2013.01); *A62D 1/0021* (2013.01); *A62D 1/0092* (2013.01); *C09D 5/022* (2013.01);
   (Continued)

(58) Field of Classification Search
   CPC ............................... A62D 1/0021; C09D 5/18
   See application file for complete search history.

(56) References Cited

U.S. PATENT DOCUMENTS

| | | |
|---|---|---|
| 2008/0261013 A1 | 10/2008 | Lee |
| 2010/0287867 A1 | 11/2010 | Constantino |
| 2022/0298421 A1 | 9/2022 | Mudaliar et al. |

FOREIGN PATENT DOCUMENTS

| | | | | |
|---|---|---|---|---|
| WO | 2012177181 A1 | 12/2012 | | |
| WO | WO-2012177181 A1 | * 12/2012 | ........... | A62D 1/0021 |

OTHER PUBLICATIONS

Machine-generated English-language translation of WO-2012177181-A1.*

(Continued)

*Primary Examiner* — Vu A Nguyen
(74) *Attorney, Agent, or Firm* — True Shepherd LLC; Andrew C. Cheng

(57) ABSTRACT

An environment-friendly fire-retardant coating comprises a coating substrate and fire-extinguishing agent microcapsules which can be ruptured and vaporized to a release fire-extinguishing material to achieve the purposes of cooling and/or fire prevention and/or fire extinguishing upon being exposed to a temperature of not less than 75° C. and/or an open flame environment. In order to break the current situation that the traditional fire-prevention, fire-extinguishing and flame-retardant coatings can only prevent the spread of the fire area, but it is difficult to extinguish the fire sensitively and actively in a short time, there are provided a variety of coatings and/or films which can actively cool down, prevent fire and extinguish the fire, have short response time, have stable fire-extinguishing components in the coatings and/or films, with the films being able to trigger the fire extinguishment repeatedly.

10 Claims, 12 Drawing Sheets

(51) Int. Cl.
*C09D 5/02* (2006.01)
*C09D 7/40* (2018.01)
*C09D 7/63* (2018.01)
*C09D 175/04* (2006.01)

(52) U.S. Cl.
CPC ............... *C09D 5/024* (2013.01); *C09D 7/63* (2018.01); *C09D 7/70* (2018.01); *C09D 175/04* (2013.01)

(56) References Cited

OTHER PUBLICATIONS

Teles et al., Journal of Analytical and Applied Pyrolysis 163 (2022) 105466.*

* cited by examiner

ENVIRONMENT-FRIENDLY FIRE-RETARDANT COATING AND PREPARATION METHOD THEREOF

CROSS-REFERENCE TO RELATED APPLICATIONS

This application is a continuation of International Patent Application No. PCT/CN2023/097745 with a filing date of Jun. 1, 2023, designating the United States, now pending, and further claims priority to Chinese Patent Application No. 202210673741.0 with a filing date of Jun. 15, 2022. The content of the aforementioned applications, including any intervening amendments thereto, are incorporated herein by reference.

TECHNICAL FIELD

The present disclosure mainly relates to the technical field of fire-retardant coatings, in particular to an environment-friendly fire-retardant coating and a preparation method thereof.

BACKGROUND

Fire-retardant coating refers to a kind of coating applied on the surface of an object, which can prevent the fire from happening, prevent the fire from spreading or isolate the fire source, prolong the ignition time of the substrate or increase the thermal insulation performance to delay the structural failure time, including steel structure fire-retardant coatings, decorative fire-retardant coatings, cable fire-retardant coatings, prestressed concrete floor fire-retardant coatings, etc. Usually, it is prepared by adding a flame retardant and additives into the coating substrate, and plays a role in fire protection through the incombustibility, low thermal conductivity or heat absorption of the flame retardant. For example, a flame retardant including ammonium polyphosphate, pentaerythritol, aluminum hydroxide is added to a coating substrate to realize the flame retardancy and weatherability of the fire-retardant coating as disclosed in Chinese patent application with a publication number of CN111073414A. An intumescent flame retardant composed of a low-grade carbon source, a char-forming catalyst and a foaming agent is used to prepare a fire-retardant coating according to Chinese patent application with a publication number of CN113480928A. However, the flame retardant can only prevent the spread of the fire area, but it is difficult to actively extinguish the fire in a short time, and the fire extinguishing agent with fire extinguishing effect is usually difficult to exist stably in the coating. Therefore, it is of great practical significance to develop a fire-retardant coating with a short fire extinguishing response time and stable coexistence of the fire extinguishing agent materials and the coating.

The background technology contained in the present disclosure belongs to the content of the present disclosure, and the above background knowledge is intended to assist in understanding the technical solution of the present disclosure, and does not necessarily belong to the prior art of the present disclosure. In the absence of definite evidence that the above content has been disclosed on the filing date of the present disclosure, the above background knowledge should not be used to evaluate the originality of the technical solution of the present application.

SUMMARY

The problem to be solved by the present disclosure is to provide a variety of coatings and/or films which can actively cool down, prevent fire and extinguish fire, have short response time, have stable fire-extinguishing components in the coatings and/or films that can repeatedly trigger fire-extinguishing in order to break the current situation that the traditional coatings can only prevent the spread of fire areas, but are difficult to extinguish fire sensitively and actively in a short time.

Solution to the Problem

According to a first aspect of the present disclosure, there is provided an environment-friendly fire-retardant coating, including:

a coating substrate; and fire extinguishing agent microcapsules that are ruptured and vaporized to a release fire-extinguishing material to achieve the purposes of cooling and/or fire prevention and/or fire extinguishment upon being exposed to a temperature of not less than 75° C. and/or an open flame environment.

According to a second aspect of the present disclosure, there is provided a coating composition including: a film-forming substance; a solvent; and fire extinguishing agent microcapsule; the fire extinguishing agent microcapsule has at least two layers of wall materials; the wall material of the fire extinguishing agent microcapsule can be ruptured at a temperature not lower than 75° C.; the fire extinguishing agent microcapsule vaporizes to release a core material after the wall material is ruptured.

According to a third aspect of the present disclosure, there is provided a powder coating, which includes a film-forming component as a coating film-forming resin, and further comprising fire extinguishing agent microcapsules; the fire extinguishing agent microcapsule has at least two layers of wall materials; the wall material of the fire extinguishing agent microcapsule is ruptured at a temperature not less than 100° C., preferably at 120° C.-150° C.; the fire extinguishing agent microcapsule is vaporized to release a microcapsule core material after the wall material is ruptured.

The film-forming component is used as a film-forming resin to form a film through ultraviolet curing.

The film-forming component includes a photocurable resin and a photoinitiator.

The photocurable resin is selected from at least one of unsaturated polyacrylate, methacrylate modify polyester, a mixture of unsaturated polyester and acrylate, acrylate grafted polyester, acrylated polyacrylate, epoxy resin, epoxy acrylate, polyurethane acrylate or hyperbranched polyester acrylate.

The coating powder is melt-leveled at a temperature not higher than the fire-extinguishing response temperature of the wall material of the fire extinguishing agent microcapsules and not lower than the melt-leveling temperature of the film-forming component.

According to a fourth aspect of the present disclosure, there is provided an use of the powder coating of the third aspect in the preparation of a cooling and/or fire-prevention and/or fire-extinguishing coating film.

According to a fifth aspect of the present disclosure, provided is a coating film, which is specifically a continuous and/or discontinuous film which is coated or uncoated on a surface of a substrate and formed after drying; the coating film contains a fire extinguishing material.

According to a sixth aspect of the present disclosure, there is provided a coated article including:
a substrate; and
a coated article with a coating film formed by the environmentally-friendly fire-retardant coating according to according to the first aspect; and/or with a coating film formed by the coating composition according to the second aspect; and/or with a coating film formed by the powder coating according to the third aspect; and/or forming the coating film according to the fifth aspect on a surface of the substrate.

On the basis of common sense in the field, the above-mentioned optimal conditions can be combined with each other to obtain specific embodiments.

The raw materials or reagents involved in this present disclosure are all common commercially available products, and the operations involved are all routine operations in this field unless otherwise specified.

Beneficial Effects of the Present Disclosure

According to the present disclosure, an environment-friendly fire-retardant coating can be provided, the coating substrate and the fire extinguishing agent microcapsules coexist stably, the fire extinguishing agent microcapsules are uniformly dispersed in the coated dry coating film, the wall material is cracked and vaporized to release the contained fire extinguishing material in a high temperature or open flame environment, and the fire extinguishing material quickly absorbs heat to realize automatic cooling and fire extinguishing, so that the practicability is high.

According to the present disclosure, the fire extinguishing agent microcapsule overcomes the defect that fire extinguishing materials are volatile and difficult to store at normal temperature and pressure, and the existence of nano silicon dioxide and nano metal oxide is beneficial to absorb hydrolysis products after microcapsule hydrolysis, reduce hydrofluoric acid residue, avoid corrosion of other microcapsule wall materials, maintain the inherent shape of microcapsules, and improve storage stability and reusability of fire-extinguishing coatings.

According to the present disclosure, a coating composition can be provided, and the fire extinguishing agent microcapsules have good compatibility with film-forming substances and solvents, and the fire extinguishing agent microcapsules have high core-wall ratio and high fire extinguishing sensitivity, and can actively cool down, prevent fire and extinguish fire.

According to the present disclosure, a powder coating can be provided. By selecting and limiting the wall material and preparation process of fire extinguishing agent microcapsules, for example, but not including selecting suitable polymer materials, improving the cross-linking degree of polymer materials, increasing the number of layers of wall materials, etc., it is helpful to improve the fire extinguishing response temperature of fire extinguishing agent microcapsules, so that fire extinguishing agent microcapsules whose wall materials are ruptured at not less than 100° C., more preferably 120° C.-150° C., can be obtained; when applied to a photocuring powder coating, the powder coating is melted at a temperature not higher than the fire-extinguishing response temperature of the wall material of fire-extinguishing agent microcapsule and capable of melting and leveling the film-forming resin, and then a coating film is formed by photo-curing, so that excellent cooling and/or fire prevention and/or fire extinguishing functions are exerted.

According to the present disclosure, a coating film can be provided, and when the temperature of the coating film is raised to 75° C. or above, or when the coating film encounters an open flame environment, the fire extinguishing material in the coating film is released by vaporization, and the fire extinguishing material vaporizes and quickly absorbs environmental heat, so that the ambient temperature is instantly reduced to realize automatic cooling and automatic fire prevention.

According to the present disclosure, a coated article can be provided, and any substrate that can form a coating film on the surface can be selected, preferably an article that may be exposed to a high-heat and/or open flame environment as an unfavorable environment. After being exposed to the high-temperature and/or open flame environment, the coating film on the surface of the coated article can be heated and vaporized to release a fire-extinguishing material and quickly absorb heat to reduce the local temperature, thus realizing active cooling and active fire extinguishing, greatly reducing the damage of the substrate caused by high-temperature or open flame erosion, and not causing other pollution to the substrate, and being environment-friendly.

The present disclosure adopts the technical solution to achieve the above purpose, which makes up the shortcomings of the prior art, and has reasonable design and convenient operation.

BRIEF DESCRIPTION OF DRAWINGS

In order to make the above and/or other objects, features, advantages and examples of the present disclosure more obvious and understandable, the attached drawings are described as follows.

DESCRIPTION OF EMBODIMENTS

Figure 1:
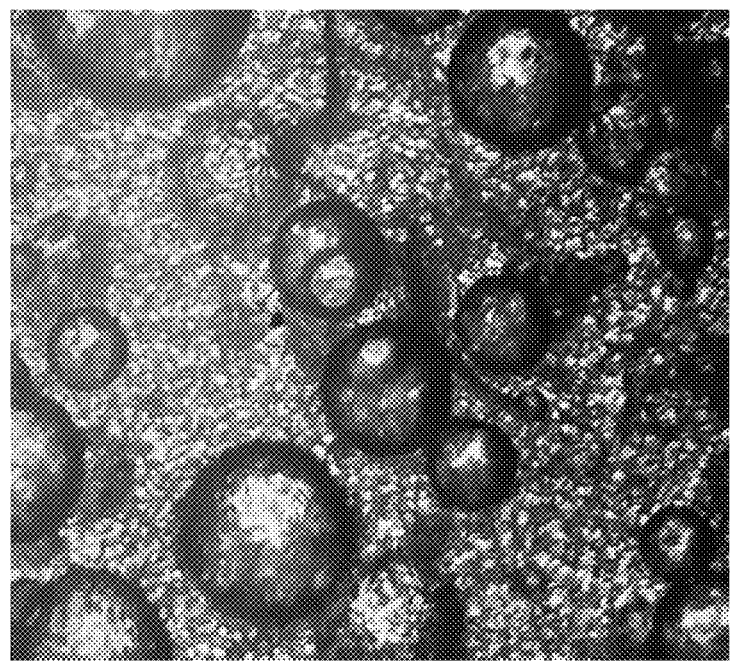
FIG. 1 is a microscopic image showing the fire extinguishing agent microcapsules obtained in Example 1 (the liquid fire extinguishing material is highlighted)

Those skilled in the art can learn from the contents of this paper and appropriately replace and/or modify the process parameters. However, it is particularly necessary to point out that all similar substitutions and/or modifications are obvious to those skilled in the art, and they are regarded as included in the present disclosure. The products and preparation methods described in the present disclosure have been described by preferred examples, and relevant personnel can obviously change or appropriately change and combine the products and preparation methods described herein without departing from the content, spirit and scope of the present disclosure, so as to realize and apply the technology of the present disclosure.

Unless otherwise specified, the materials, methods and examples described herein are only illustrative and not restrictive. Although methods and materials similar or equivalent to those described herein can be used in the practice or testing of the present disclosure, suitable methods and materials are described herein.

When quantities, concentrations or other values or parameters are given as ranges, preferred ranges or a series of upper and lower preferred values, it should be understood that it specifically discloses all ranges formed by any pair of values of any larger range limit or preferred value and any smaller range limit or preferred value, regardless of whether the ranges are separately disclosed. For example, when describing the range of "1 to 5(1-5)", the described range should be understood as including "1 to 4(1-4)", "1 to 3(1-3)", "1 to 2(1-2)" and "1 to 2(1-2) and 4 to 5 (4-4). Unless otherwise specified, where numerical ranges are described herein, the ranges include the end values of the ranges and all integers and fractions within the ranges.

It should be clear that, unless otherwise specified, the appropriate application of one or several features in this application means that the above-mentioned restrictions on the features are appropriate and selectively applicable to the corresponding features described later, that is, unless otherwise specified, the disclosure of one or several features in one part of this application is applicable to the corresponding features in other parts of this application, and the corresponding features in other parts are also fully disclosed based on the disclosure.

Unless otherwise specified, all percentages, parts, proportions, etc. are by weight; otherwise stated, including but not limited to, "wt %" means a weight percentage, "mol %" means a mole percentage and "vol %" means a volume percentage.

Unless otherwise specified, the "core material" and "fire extinguishing material" refer to the fire extinguishing active substance wrapped in the fire extinguishing agent microcapsule; the meanings of "microcapsule rupture temperature", "wall material rupture temperature", "rupture temperature" and "fire extinguishing response time" are all the same, and all refer to the temperature at which the wall material of the fire extinguishing agent microcapsule is significantly ruptured to release the contents.

There are many studies on core-shell fire extinguishing agent microcapsules, which are briefly introduced as follows.

In the prior art, a flame-retardant microcapsule as well as a preparation method and use thereof are disclosed in Chinese patent application with a publication number of CN105218714A. The flame-retardant microcapsule comprises a core material and a coating layer covering the outer side of the core material; the core material is liquid heptafluoropropane or liquid hexafluoropropane; the coating layer is a polymethacrylate polymer and is prepared by suspension polymerization. However, because the boiling point of its core material, i.e., heptafluoropropane, is −16.4° C., and the boiling point of hexafluoropropane is −1.4° C., the gaseous core material needs to be pressurized to 3-8 MPa to change into liquid state, so the preparation process is complicated and the preparation cost is high.

In the prior art, a microcapsule fire extinguishing agent and a preparation method thereof are disclosed in Chinese patent application with a publication number of CN1126571140A. The microcapsule fire extinguishing agent includes a flame-retardant shell composed of a low-melting point copolymer and a cooling core containing a cooling material; the low melting point copolymer is formed by copolymerization of a low melting point polymer monomer and a flame retardant; the low melting point copolymer is styrene-methyl methacrylate-methacrylic acid-2-bromo-3,3,3-trifluoropropene quadripolymer; the cooling material includes one or more of fluorinated ketones, fluoropropane, glycerol and alcohols. However, the temperature in the preparation process needs to be up to 60-90° C. and the reaction pressure should be set to 1.0-1.5 Mpa. The higher pressure and temperature significantly improve the complexity of the process and the threshold of industrial production is higher.

In the prior art, a high-stability fire-extinguishing microcapsule and a preparation method thereof are disclosed in Chinese patent application with a publication number of CN113476778A. The core material comprises a fire extinguishing agent, an outer shell comprises an inner layer, an outer layer and an air tightness enhancer; the inner layer comprises a modified melamine formaldehyde resin generated by the reaction of melamine, m-phenylenediamine, urea and formaldehyde solution, and the outer layer adopts a modified polyurethane resin generated by the reaction of trimethylol dodecanediisocyanate adduct and gelatin solution; the organic fire extinguishing agent adopts an intumescent flame retardants, i.e., pentaerythritol phosphate, perfluorohexanone and decabromodiphenyl ethane. However, in step d) of the preparation step of this solution, the reaction temperature is as high as 85° C., which is not conducive to the formation of microcapsules because of the low boiling point of perfluorohexanone, and is not conducive to the response to fire extinguishing because of the high boiling point of decabromodiphenyl ethane. In addition, the rupturing temperature of its shell is as high as 180-220° C., which cannot play a role in cooling and early warning of fire.

In the prior art, a perfluorohexanone microcapsule flame-retardant medium and its preparation method, product and use thereof are disclosed in Chinese patent application with a publication number of CN114558268A. The perfluorohexanone microcapsule flame-retardant medium includes, in parts by weight, 140 parts of a core material and 2528 parts of a shell material; the core material is perfluorohexanone; the shell material is formed by mixing a polymer capsule material and polyvinyl alcohol; the specific embodiment shows that the explosion crushing temperature of perfluorohexanone microcapsules obtained by this solution is 97° C., which can not play the role of cooling and/or fire prevention, and has a weak early warning effect on fire.

In the prior art, a microcapsule fire extinguishing agent, a preparation method thereof, a fire extinguishing composite material and a fire-extinguishing coating are disclosed in Russian patent application with an application number of RU2011125756. The microcapsule fire extinguishing agent can be exploded within the range of 90-270° C. to realize the release of the content fire extinguishing agent material and achieve the purpose of fire extinguishing.

In the prior art, a microcapsule automatic fire extinguishing agent is disclosed in Chinese patent application with publication numbers of CN109420281A and CN109453491A. The fire extinguishing agent comprises a main fire extinguishing material, a microcapsule coating material and auxiliary materials, wherein the main fire extinguishing material is wrapped by the coating material to form microcapsules, and the main fire extinguishing materials are one or more of perfluoroacetone, perfluorobutanone, perfluoropentanone, perfluorohexanone, perfluoropropane, perfluorobutane, perfluoropentane, perfluorohexane, perfluoroheptane, perfluorooctane, tetrafluoroethylene dibromoethane and trifluorotrichloroethane, and one or more of polymer resin, fiber and inorganic filler as auxiliary materials, wherein the inorganic filler is one or more of calcium carbonate, silicon dioxide, titanium dioxide, aluminum oxide and aluminum hydroxide. According to the preparation method, firstly, the coating material is formed into prepolymer, then the prepolymer, the main fire extinguishing material and the monomer emulsion formed after water emulsification react at 40-80° C. to obtain microcapsule suspension, and then the microcapsule suspension is mixed with auxiliary materials and molded. However, among the main fire extinguishing materials, the boiling points of perfluorohexanone, perfluorohexane, tetrafluoroethane and trifluorotrichloroethane are 49° C., 57.8° C., 49.8° C., 47.57° C. respectively. The boiling points of these materials are significantly lower than their reaction temperature of 80° C. Under the temperature of this technical solution, a large number of main fire extinguishing materials will escape, which is not conducive to the yield of microcapsules. In addition, auxiliary materials are added to the microcapsule suspension for molding, and the auxiliary materials are wrapped around the microcapsule, so the inorganic fillers such as calcium carbonate, silicon dioxide, titanium dioxide, aluminum oxide, aluminum hydroxide have no substantial effect on the rupture and protection of the microcapsule.

The following is a detailed description of the process of achieving the present disclosure involved in this application.

"Environment-Friendly Fire-Retardant Coating"

Provided is an environment-friendly fire-retardant coatings, including:

a coating substrate; and fire extinguishing agent microcapsules that are ruptured and vaporized to a release fire-extinguishing material to achieve the purposes of cooling and/or fire prevention and/or fire extinguishment upon being exposed to a temperature of not less than 75° C. and/or an open flame environment.

[Fire Extinguishing Agent Microcapsules]

Various embodiments are described, and the fire extinguishing agent microcapsule includes:

a core material that vaporizes and absorbs heat when released by heat;

at least two layers of wall materials containing a polymer material; and the wall material can be ruptured at a temperature not lower than 75° C.

Various embodiments are described, and the wall material can be ruptured at not less than 80° C., 85° C., 90° C., 95° C., 100° C., 120° C. and 150° C.

Various embodiments are described. When the fire extinguishing agent microcapsules are exposed to the environment at a temperature of not less than 80° C., not less than 85° C., not less than 90° C., not less than 95° C., not less than 100° C., not less than 120° C. and not less than 150° C., they will be ruptured and vaporized to release fire extinguishing materials to achieve the purposes of cooling and/or fire prevention and/or fire extinguishing.

Various embodiments are described, and the fire extinguishing response time of the fire extinguishing agent microcapsule is not higher than 25 s.

Various embodiments are described, and the core-wall ratio of the fire extinguishing agent microcapsule is 1:1-9:1.

Various embodiments are described, and the embedding rate of the fire extinguishing agent microcapsules is not lower than 80%.

Various embodiments are described, and the particle size of the fire extinguishing agent microcapsules is 20-400 μm.

Various embodiments are described, and the fire extinguishing agent microcapsules emit a crackling sound when they are ruptured by heat.

The purpose of this paper is to provide an environment-friendly fire-retardant coating including film-forming substances and fire-extinguishing agent microcapsules. As a fire-extinguishing agent microcapsule material with fire-extinguishing function, there is no further limitation on the types of film-forming substances, and it can coexist stably with conventional coatings. When the temperature of the coating rises to 75° C. or above and meets an open flame environment, the fire-extinguishing agent microcapsules will be ruptured and release the content fire-extinguishing material by vaporization, so as to quickly absorb the environmental heat and reduce the temperature of the hot spot or the ignition point or the surrounding temperature below the flame point temperature, thus realizing automatic cooling. The environment-friendly fire-retardant coating provided by the application is different from the common fire-retardant coating in that it can actively cool down and extinguish the fire, instead of preventing the spread of the ignition point obtained by the common fire-retardant coating due to the application of flame retardants, and its fire-extinguishing effect is predictable in the fire environment caused by the temperature rise, which significantly improves the convenience and application scope of fire prevention and extinguishing, so it has higher utilization value.

Various embodiments are described, and fire extinguishing agent microcapsules are prepared by the following preparation methods:

1) preparing a first wall material solution, adding a first auxiliary agent, uniformly mixing, adding a 100-900% fire extinguishing material of the first wall material, stirring and emulsifying to form a microcapsule emulsion;
2) adding a cross-linking agent into the microcapsule emulsion, filtering, washing and separating after cross-linking to obtain preliminarily solidified fire extinguishing agent microcapsules;
3) preparing a second wall material solution, dispersing the preliminarily solidified fire extinguishing agent microcapsules in the second wall material solution, filtering, washing and drying after curing to obtain the fire extinguishing agent microcapsules.

Various embodiments are described, and the first wall material and the second wall material independently contain at least one of natural polymer, semi-synthetic polymer or synthetic polymer.

Various embodiments are described, and the first auxiliary agent comprises at least one of nano silicon dioxide, nano metal oxide or anti-ultraviolet agent.

Various embodiments are described. In step 1), the mass concentration of the first wall material solution is 5-30%.

Various embodiments are described. In step 1), the first auxiliary agent is nano silicon dioxide and nano metal oxide with a weight ratio of 1:(2.5-5).

Various embodiments are described. In step 1), the temperature of stirring and emulsification is 0-40° C. and the stirring rate is 30-6000 r/min.

Various embodiments are described. In step 2), a second auxiliary agent is added to the second wall material solution and mixed evenly, and the second auxiliary agent comprises at least one of nano silicon dioxide, nano metal oxide or anti-ultraviolet agent.

Various embodiments are described. In step 2), the crosslinking agent is at least one of potassium chromate sulfate, chromium acetate, formaldehyde and glutaraldehyde, and the amount of the crosslinking agent is 0.1-10% of the dry weight of the wall material.

Various embodiments are described. In step 2), the crosslinking time is at least 30 min.

Various embodiments are described. In step 3), if the second wall material solution cannot form a film, the conventional curing agent or crosslinking agent corresponding to the wall material polymer is added, and the amount is 0.1-10% of the dry weight of the polymer.

Various embodiments are described. In step 3), the curing agent or crosslinking agent is preferably selected from at least one of potassium chromate sulfate, chromium acetate, formaldehyde or glutaraldehyde.

Various embodiments are described. In step 3), the curing time is at least 30 min.

Various embodiments are described, and the fire extinguishing agent microcapsules with more than two layers of wall materials can be obtained by repeating step 3).

In the process of preparing fire extinguishing agent microcapsules, it is impossible to form a stable core-shell structure by wrapping the fire extinguishing agent materials with a single wall material. Through a large number of experimental studies, the inventors found that wrapping the fire extinguishing agent materials with at least two layers of wall materials is beneficial to obtain stable and successfully separated fire extinguishing agent microcapsules, and through the parameters of reaction temperature and stirring speed during coating, the fire extinguishing agent microcapsules with an embedding rate of not less than 80%, a core-wall ratio of 9:1 to 1:1 and a particle size of 20-400 μm can be obtained, and the fire extinguishing agent microcapsules with more than two layers of wall materials can be obtained by changing the feeding ratio, changing the stirring speed and adjusting the particle size, and coating the wall materials repeatedly. The existence of nano-silica and nano-metal oxide contributes to the stable preservation of microcapsule particles. A small amount of water will enter the microcapsule during the preparation process, and then the fire extinguishing agent will be partially hydrolyzed. During the fire extinguishing and storage process, the fire extinguishing material will also be partially hydrolyzed. Hydrofluoric acid, the hydrolysis product, can corrode the wall materials of the microcapsule, thus leaking the contents, making the contents slowly volatilize and reducing the fire extinguishing effect of the microcapsule. Adding nano-silica and nano-metal oxide in the process of preparing microcapsules can quickly absorb the hydrolysate of fire extinguishing materials, and the nano-oxide reacts with hydrofluoric acid to form fluoride which is difficult to ionize, thus reducing the residue of hydrofluoric acid, avoiding its erosion on the wall materials of microcapsules, maintaining the inherent shape of unbroken microcapsules and significantly improving the storage stability of microcapsules.

Core Material

Various embodiments are described, and the core material is selected from at least one of perfluorohexanone, perfluorohexane, perfluoroheptane, perfluorooctane, tetrafluoroethylene dibromoethane or trifluorotrichloroethane.

Various embodiments are described, and the core material is perfluorohexanone.

Perfluorohexanone is a new type of environment-friendly fire extinguishing agent. It is a liquid at room temperature, and its heat of vaporization is only 4% of that of water, while its vapor pressure is 2500% of that of water. Therefore, it is easy to vaporize and can quickly absorb heat to achieve the effect of cooling. The ozone depletion potential of perfluorohexanone is 0, the global greenhouse effect potential is 1, and the atmospheric survival life is 0.014 (5 days), so it can replace halon fire extinguishing agent for a long time. Unfortunately, its use as a fire extinguishing agent is still limited because its boiling point is only 49° C. For example, Chinese utility model patent No. CN2019213773896 discloses a suspended perfluorohexanone fire extinguishing device including a tank. When the temperature-sensitive glass column is cracked due to heating, the sealing sheet is separated from the discharge port, and the perfluorohexanone in the tank is sprayed to the fire source. Therefore, this kind of fire extinguishing device needs to fill perfluorohexanone in the tank, and its obvious disadvantages are that the tank occupies a large volume, so it is difficult to be used in precision instruments or solid materials, and it is inconvenient to move and requires manual operation to realize fire extinguishing. Chinese patent applications No. CN109420281A and CN109453491A disclose a microcapsule automatic fire extinguishing agent, which is prepared by coating a main fire extinguishing material with a resin shell formed by reacting melamine and/or urea-formaldehyde with formaldehyde. However, the mass percentage of the main fire extinguishing material is 35-60%, the core wall is relatively low, and the fire extinguishing effect is poor. Emulsifying prepolymer, main fire extinguishing material and water to obtain monomer emulsion, heating to 40-80° C., and completely reacting the materials to be coated to obtain microcapsule suspension. In the preparation process, the prepolymer, the main fire extinguishing material and water are emulsified to obtain monomer emulsion, the temperature is raised to 40-80° C., and the materials to be coated react completely to obtain microcapsule suspension. In this temperature range, the main fire extinguishing material will evaporate and escape, so the final microcapsule yield should be extremely low, and its excitation temperature reaches 96° C., so its solution is of little use value. Therefore, a fire extinguishing agent microcapsule which is wrapped by at least two layers of wall materials containing polymer materials is provided, which not only ensures the structural stability of the fire extinguishing agent microcapsule, but also overcomes the defect that the fire extinguishing material is volatile and difficult to store at normal temperature and pressure in traditional application, and the fire extinguishing agent microcapsule maintains stable properties and structure in a conventional environment without obvious high-temperature pyrogen or open flame, and its fire extinguishing performance will not be attenuated after long-term storage; furthermore, the fire-extinguishing response temperature of the microcapsule is reduced to 80° C. or even 75° C. When it is heated to the fire-extinguishing response temperature or meets an open flame, the wall material of the fire-extinguishing agent microcapsule is ruptured, and the fire-extinguishing material is released and vaporized, which quickly absorbs heat and insulates the air, so that the temperature is reduced below the flame point temperature to realize automatic fire extinguishing. The fire extinguishing agent microcapsule provided by the present disclosure can be used as a temperature-triggered cooling material, a fire-retardant material and a fire extinguishing material, and can be compounded with various materials and interfaces which do not corrode the wall materials of the microcapsule to prepare various cooling, fire-retardant and fire extinguishing products.

Wall Material

Various embodiments are described. The softening point of the polymer material is 30-100° C. before cross-linking and 75-150° C. after cross-linking.

Various embodiment are described, and that soften point of the crosslinked polymer material is 100-150° C.

Various embodiment are described, and that soften point of the crosslinked polymer material is 120-150° C.

Various embodiments are described, and the air permeability of the crosslinked polymer material is ≤700 ml/(cm$^2$·h).

Various embodiments are described, and the shrinkage of the polymer material after crosslinking is less than or equal to 5%.

Various embodiments are described, and the water absorption rate of the crosslinked polymer material is less than or equal to 5%.

Various embodiments are described, and the tensile strength of the crosslinked polymer material is more than or equal to MPa.

Chinese patent application No. CN112439154A discloses a perfluorohexanone fire extinguishing capsule and its preparation method, wherein the capsule core is 98.2-98.8% and the capsule shell is 1.2-1.8%; the core-wall ratio is 55:1-82:1, and the capsule size is 0.3-1.2 cm$^3$; perfluorohexanone is a liquid which is easy to vaporizem and it is doubtful to obtain perfluorohexanone capsules with a large volume and extremely high core-wall ratio. The particle size of the fire extinguishing agent microcapsules provided by the application is 20-400 μm, and microcapsules with different particle sizes can be obtained by adjusting the stirring speed when preparing the microcapsules; the micron-sized micro-powder structure is beneficial to adding the microcapsules into coatings, slurry and the like to prepare fire extinguishing products; the fire extinguishing agent microcapsules are uniformly distributed in the fire extinguishing products, and have high core-wall ratio; and when the external temperature is higher than the fire extinguishing response temperature or the rear wall material is cracked and vaporized in an open flame environment, the fire extinguishing materials are released to achieve the purposes of cooling, fire prevention and fire extinguishing. Polymer physical properties in microcapsule wall materials are necessary for the structural stability and excellent fire extinguishing performance of fire extinguishing agent microcapsules. The high strength of crosslinked polymer materials is beneficial to the formation and structural stability of microcapsules. After crosslinking and curing, polymer materials have low air permeability, low moisture permeability and low shrinkage. The softening point of polymer materials before crosslinking is also beneficial to the formation of microcapsules. Too high softening point before crosslinking will lead to the loss of fire extinguishing materials during preparation. Too low may lead to lower core-wall ratio and lower embedding rate, which is not conducive to efficient fire extinguishing. It should be understood that the softening point of cross-linked polymer materials is not the only determinant of the initial rupture temperature of microcapsules, and the rupture of microcapsules is a continuous and gradual process. The microcapsules in this application begin to be ruptured at 75° C. to play a role in cooling and/or fire prevention and/or fire extinguishing, that is, they begin to rupture at 75° C. to release the content fire extinguishing agent materials; similarly, the softening point of crosslinked polymer materials is directly related to the fire-extinguishing response temperature of microcapsules. If it is too low, it is not conducive to storage, which may cause the fire-extinguishing materials to escape in the conventional environment. If it is too high, the cooling and fire-extinguishing effect will be greatly reduced. The permeability of polymer materials is related to the compactness of microcapsule wall materials. If the permeability is too high, its compactness will decrease, which may lead to the vaporization and escape of fire extinguishing materials in microcapsules at room temperature, which is not conducive to long-term storage and the fire extinguishing effect will decrease. The shrinkage of polymer materials is related to the dimensional stability of microcapsules. Too large or too small shrinkage is not conducive to the structural stability of microcapsules, and may also lead to the rupture of microcapsules, which is not conducive to compounding with other materials. The water absorption rate of polymer materials is related to the permeability of microcapsule wall materials. If the water absorption rate is too high, it is necessary to improve the humidity requirements of its storage environment, and erosion by water environment will also lead to content leakage. The various physical properties of the polymer materials mentioned above do not singly affect the properties of the fire extinguishing agent microcapsules, but participate in combination, which finally endows them with excellent high stability and sensitive and low fire extinguishing response temperature in the conventional environment. It should be understood that at least one change in the above physical properties will lead to the difficulty in forming fire extinguishing agent microcapsules, the decrease in storage stability and the decrease in fire extinguishing effect; non-limiting examples include: selecting suitable polymer materials, improving the cross-linking degree of polymer materials, increasing the number of layers of wall materials, etc., which are helpful to improve the fire response temperature of fire extinguishing agent microcapsules.

Various embodiments are described, and the polymer material is selected from at least one of natural polymer, semi-synthetic polymer or synthetic polymer.

Various embodiments are described, and the natural polymer is selected from at least one of gelatin, alginate, Arabic gum, chitosan, chitosan oligosaccharide, xanthan gum, β-cyclodextrin, polyglutamic acid, guar gum or carrageenan.

Various embodiments are described, and the semi-synthetic polymer is selected from at least one of sodium carboxymethyl cellulose, hydroxypropyl methylcellulose, carboxymethyl cellulose, sodium carboxymethyl guar gum, starch octenylsuccinate or low methoxyl pectin.

Various embodiments are described. The synthetic polymer is selected from at least one of polymethacrylate, epoxy resin, polyurethane, polyester resin, amino resin, phenolic resin, acrylic resin, furan resin, resorcinol-formaldehyde resin, xylene-formaldehyde resin, unsaturated polyester, melamine-formaldehyde prepolymer, polyimide or urea-formaldehyde resin.

The polymer material in the wall material is at least one of the above-mentioned natural polymers, preferably the natural polymer is gelatin, at least one of the above-mentioned semi-synthetic polymers, preferably the semi-synthetic polymer is sodium carboxymethyl cellulose, at least one of the above-mentioned synthetic polymers, preferably the synthetic polymer resorcinol-formaldehyde resin. The polymer materials or their combinations mentioned above have the appropriate softening point, low air permeability, shrinkage, water absorption and excellent mechanical strength after curing and crosslinking, so they can be used for wall materials to wrap fire extinguishing materials. It should also be clear that the conventional curing agent or crosslinking agent corresponding to wall materials can be selectively applied according to the film-forming performance of the above polymer materials, and the application amount is 0.1-10% of the dry weight of the corresponding wall materials.

Various embodiments are described, and the polymer material in the inner wall material contacting with the core material is selected from at least one of gelatin, alginate, Arabic gum, chitosan, chitosan oligosaccharide, xanthan gum, guar gum, carrageenan, polyglutamic acid, carboxymethyl cellulose, sodium carboxymethyl guar gum, β-cyclodextrin or starch octenylsuccinate.

Various embodiments are described. The polymer material of the second wall material in contact with the inner wall material is selected from at least one of polymethacrylate, epoxy resin, polyurethane, amino resin, phenolic resin, acrylic resin, furan resin, resorcinol-formaldehyde resin, xylene-formaldehyde resin, unsaturated polyester, melamine-formaldehyde prepolymer, polyimide or urea-formaldehyde resin.

Various embodiments are described, and the inner wall material and/or the second layer contains at least one anti-ultraviolet agent of salicylates, benzophenone or benzotriazole.

Various embodiments are described, and the amount of the anti-ultraviolet agent is 0.05-0.2% of the dry weight of the wall material layer.

Various embodiments are described, and the salicylate is selected from at least one of benzyl salicylate, hexyl salicylate, ethylhexyl salicylate, phenyl salicylate, octyl salicylate, dicyclohexyl salicylate or isohexadecyl salicylate.

Various embodiments are described, and the benzophenone is selected from at least one of 2-hydroxy-4-methoxy benzophenone, 2-hydroxy-4-n-octyloxy benzophenone or 2-hydroxy-4-dodecyloxy benzophenone.

Various embodiments are described, and the benzotriazole is selected from at least one of UV-326, UV-327, UV-328, UV-329, UV-P or UV-5411.

Various embodiments are described, and the wall material contains nano silicon oxide and/or nano metal oxide.

Various embodiments are described, and the wall material contains nano silicon oxide and nano metal oxide in a weight ratio of 1:2.5-5.

Various embodiments are described, and the inner wall material in the wall material contains nano silicon oxide and nano metal oxide in a weight ratio of 1:2.5-5.

Various embodiments are described, and the total added amount of the nano silicon dioxide and the nano metal oxide is 0.05-0.2% of the dry weight of the wall material.

Various embodiments are described, and the nano metal oxide is selected from at least one of nano zinc oxide, nano titanium oxide, nano calcium oxide, nano manganese dioxide, nano nickel oxide or nano copper oxide.

Various embodiments are described, and the particle size of the nano-silica is between 1-1000 nm, preferably 20-100 nm.

Various embodiments are described, and the particle size of the nano metal oxide is between 1-1000 nm, preferably 20-100 nm.

During the formation, fire extinguishing and storage of fire extinguishing agent microcapsules, the wall materials may be damaged due to external factors such as temperature and humidity, oxidation, illumination and oscillation, and the fire extinguishing materials will leak, and a small amount of water will enter the microcapsules during the preparation of the microcapsules, and then the fire extinguishing agent will be partially hydrolyzed. Hydrofluoric acid, one of the hydrolysis products, will corrode the wall materials of the microcapsules, thus destroying the intact microcapsule structure and causing the contents to leak due to the incomplete wall materials, which will make the fire extinguishing materials slowly volatilize and reduce the fire extinguishing effect of the microcapsules. Through a large number of experimental studies, the applicant found that adding nano-silica and nano-metal oxide into the wall material solution can significantly improve the storage stability of fire extinguishing agent microcapsules. It is well known to technicians in this field that fire extinguishing materials are easy to hydrolyze during fire extinguishing. Hydrolysis forms hydrofluoric acid, which further erodes the wall materials, further leaks the fire extinguishing materials and reduces their service life. Nano-metal oxides can absorb the hydrolysis products of fire extinguishing materials and react with hydrofluoric acid to form fluoride which is difficult to ionize, thus reducing the residue of hydrofluoric acid, avoiding its erosion on the wall materials of microcapsules, maintaining the inherent form of unbroken microcapsules, significantly improving the storage stability of microcapsules, and greatly prolonging the service life and fire extinguishing times of finished products.

[Coating Substrate]

Various embodiments are described, and the coating substrate can form a continuous film with a certain strength.

Various embodiments are described, and the coating substrate contains at least one of epoxy resin emulsion, alkyd resin emulsion, polyurethane emulsion, vinyl acetate-ethylene copolymer emulsion, methacrylic resin emulsion, fluorocarbon resin emulsion, acrylic resin emulsion or styrene-acrylate emulsion.

The coating substrate in the environment-friendly fire-retardant coating is not limited to the fire extinguishing agent microcapsules, therefore any substrate that can form a continuous film with a certain strength can be selected, and the commonly used coating substrate such as epoxy resin emulsion, alkyd resin emulsion, polyurethane emulsion, vinyl acetate-ethylene copolymer emulsion, methacrylic resin emulsion, acrylic resin emulsion or styrene-acrylate emulsion is preferred. Obviously, the selection of the coating substrate should and must not cause adverse effects on the fire extinguishing agent microcapsules in the conventional environment. The fire extinguishing agent microcapsules are compounded with the coating substrate and can form a continuous film with a certain strength, and the fire extinguishing agent microcapsules have no adverse effects on the film formation of the coating substrate. The environmentally-friendly fire-retardant coating plays an excellent, sensitive and environmentally-friendly cooling and/or fire prevention and/or fire extinguishing function.

Various embodiments are described. After being coated and dried, the smoldering time of the environment-friendly fire-retardant coating is 0s, and the afterburning time is 0s, and there is no melting drop.

Various embodiments are described. After being coated and dried, the weight loss rate of the environmentally-friendly fire-retardant coating is less than or equal to 5% in a 60° C. blast drying oven for 8 hours.

Various embodiments are described, and the mass fraction of fire-extinguishing microcapsules is 40-70%.

In the environment-friendly fire-retardant coating, the coating substrate and the fire-extinguishing agent microcapsules coexist stably. After the coating is brushed and dried at low temperature, the fire-extinguishing agent microcapsules are dispersed in the coating, and the wall materials of the microcapsules are ruptured at a certain temperature (as low as 75° C.) or under the condition of open flame, releasing the contained fire-extinguishing materials, and the fire-extinguishing materials quickly absorb heat and vaporize, so that the automatic cooling and fire extinguishing can be realized, and there is no smoldering, afterburning and molten dripping, so that the coating substrate material has good fire-extinguishing function and can be greatly protected; and the cooling and fire extinguishing process will not affect other complete microcapsule structures, therefore the fire-retardant coating of the present disclosure has a validity period of more than two years in a conventional environment and has excellent practicability.

Various embodiments are described, and the environment-friendly fire-retardant coating further comprises an auxiliary agent.

Various embodiments are described. In the environment-friendly fire-retardant coating, the weight content of coating substrate is 25-55%, the weight content of fire extinguishing agent microcapsule is 40-70%, and the weight content of auxiliary agent is 5-15%.

Various embodiments are described, and the auxiliary agent is selected from any one of a curing agent, an antioxidant, a dispersant, a plasticizer, a thickener, a defoamer, an anti-sedimentation agent, a leveling agent, a mildew and algae inhibitor, a ultraviolet absorber, a film-forming auxiliary agent, a pH regulator, an emulsifier, a corrosion inhibitor, a drier, an anti-skinning agent, a pigment, a filler, an antioxidant, a lubricant, an anti-freezing agent, an anti-color separation agent, a surfactant, an anti-tension agent, a moisture absorbent, a deodorizer, a silane coupling agent, an antistatic agent, a water repellent or an oil repellent.

By compounding the coating substrate with fire extinguishing agent microcapsules and possibly added additives, and uniformly stirring at a speed not higher than 60 r/min, the environment-friendly fire-retardant coating can be obtained.

When the environment-friendly fire-retardant coating is applied, it is dried at a temperature not higher than 45° C. for at least 2 hours to form a coating film.

[Coating Composition]
A coating composition is provided, comprising:
a film-forming substance;
a solvent; and
fire extinguishing agent microcapsules; and
the fire extinguishing agent microcapsule has at least two layers of wall materials;
the wall material of the fire extinguishing agent microcapsule can be ruptured when the temperature is not lower than 75° C.;
the fire extinguishing agent microcapsule vaporizes to release the core material after the wall material is ruptured.

[Fire Extinguishing Agent Microcapsule]
Various embodiments are described, and the weight loss of the fire extinguishing agent microcapsules is not higher than 2% after being stored in water and/or ethanol for 6 months. The fire extinguishing agent microcapsule is suitably applied to all items of the fire extinguishing agent microcapsule.

Various embodiments are described, and the wall material includes an inner wall material in contact with the core material and a second wall material in contact with the inner wall material.

Various embodiments are described, and the wall material contains 0.05-0.2% of the anti-ultraviolet agent based on the dry weight of the wall material. The wall material can be an inner wall material and/or an outer wall material. The anti-ultraviolet agent can be applied to the known anti-ultraviolet agent components which are used in the coating field in the past and will not adversely affect the microcapsule components of the fire extinguishing agent. As for the types of the anti-ultraviolet agents, the above-mentioned anti-ultraviolet agents are appropriately used.

Various embodiments are described, and the wall material contains 0.05-0.2% of nano silicon oxide and nano metal oxide based on the dry weight of the wall material. The wall material can be an inner wall material and/or an outer wall material.

Various embodiments are described, and the weight ratio of the nano silicon oxide to the nano metal oxide is 1:2.5-5. for the types of the nano-metal oxides, the above-mentioned nano-metal oxides are appropriately used.

Various embodiments are described, and the mass percentage of the fire extinguishing agent microcapsules in the coating composition is 40-70%.

[Film-Forming Substance]
Various embodiments are described, and the mass percentage of the film-forming substance in the coating composition is 10-55%.

Various embodiments are described, and the film-forming substance can be a resin component which is used in the coating field in the past, contains a matrix resin and a curing agent required according to the matrix resin, and is known per se and can form a coating film. Examples of the film-forming substance include at least one of epoxy resin, alkyd resin, polyurethane, vinyl acetate-ethylene copolymer, methacrylic resin, acrylic resin or styrene-acrylate and the like. The state of the film-forming substance includes a powder state or an emulsion state.

[Solvent]
Various embodiments are described, and the solvent includes an organic solvent and/or water.

Various embodiments are described, and the solvent can be solvent components which are used in the field of coatings in the past, do not conflict with other components in the coating where the solvent is located, and are known per se. As the kind of the solvent, organic solvents and/or water are included. Example of that organic solvent include esters, ketones, alcohols, aliphatic hydrocarbons, aromatic hydrocarbons, and the like. Specifically, examples include esters such as ethyl acetate, n-propyl acetate, butyl acetate and amyl acetate, ketones such as methyl ethyl ketone and methyl isobutyl ketone, alcohols such as methanol, ethanol, isopropanol, methoxypropanol and ethoxypropanol, and aliphatic hydrocarbons such as n-pentane, isopentane, n-hexane, isohexane, cyclohexane, n-heptane, isoheptane, 2,2,4 trimethylpentane, aromatic hydrocarbons such as benzene, toluene and xylene. The solvent is preferably an organic solvent and water.

[Others]
Various embodiments are described, and the coating composition further contains a curing agent for curing the film-forming substance.

Various embodiments are described. The film-forming substance is used in combination with a curing agent selected from amino resins, polyisocyanate compounds and blocked polyisocyanate compounds. Examples of the curing agent include acid curing agents such as aliphatic polycarboxylic acids such as decanedicarboxylic acid, dodecanedicarboxylic acid and sebacic acid, acid anhydrides of polycarboxylic acids, acid-containing acrylic resins and the like; a blocked isocyanate curing agent obtained by blocking the urea ester compound of isocyanate compounds such as hexamethylene diisocyanate, isophorone diisocyanate and xylene diisocyanate with blocking agents such as ε-caprolactam and methyl ethyl ketone oxime, and a self-blocked-type isocyanate curing agent with a uretdione bond in the molecule; amine curing agents such as aliphatic polyamines, polyaminoamides, ketoimines, cycloaliphatic diamines, aromatic diamines, imidazoles, dicyandiamide, polyamides, and β-hydroxyalkylamides; phenolic resin curing agents, etc.

Various embodiments are described, and the coating composition also contains an auxiliary agent.

Various embodiments are described, and the auxiliary additive components used in the field of coatings in the past that do not conflict with other components in the coatings to which the auxiliary agent is applied can be applied. Examples of the additives include an antioxidant, a dispersant, a plasticizer, a thickener, a defoamer, an anti-settling agent, a leveling agent, a mildew and algae inhibitor, a ultraviolet absorber, a film-forming additive, a pH regulator, an emulsifier, a corrosion inhibitor, a drier, an anti-skinning agent, a pigment, a filler, an antioxidant, a lubricant, an anti-freezing agent, an anti-color separation agent, a surfactant, an anti-tension agent, a moisture absorbent, a deodorizer, a silane coupling agent, an antistatic agent, a water repellent or an oil repellent.

An antioxidant is used to improve the anti-UV, anti-yellowing and anti-oxidation properties of coatings, and examples include at least one of 6-ethoxy-2,2,4-trimethyl-1,2-dihydroquinoline, N-phenyl-α-aniline, N-phenyl-β-naphthylamine, N-phenyl-N'-isopropyl-p-phenylenediamine or N—N'-diphenyl-p-phenylenediamine. A dispersant is used to exert the dispersing effect and fully disperse the components of the coating, and examples include at least one of polycarboxylic acids and polyacrylic acids; an plasticizer is used to reduce the hardness of the coating film and improve the ductility of the coating film, and examples include at least one of vaseline, polybutene, silicone oil, epoxidized soybean oil, dioctyl sebacate, dioctyl adipate, hydroxyl-based ternary chloroacetic acid resin or chlorinated paraffin; a thickener is used to avoid sagging and splashing of coatings, and examples include at least one of polyacrylic acid thickener, polyurethane thickener, carboxymethyl cellulose, hydroxypropyl methylcellulose, hydroxyethyl cellulose or hydroxyethyl methylcellulose; a defoamer is used to eliminate the foaming under dynamic conditions and avoid the bad influence of foaming on appearance and performance, and can be selected from at least one of sodium hexametaphosphate, sodium polyphosphate, potassium tripolyphosphate or potassium pyrophosphate; an anti-settling agent is used to impart thixotropy to the coating and improve the viscosity, such as at least one of organobentonite, amide modified hydrogenated castor oil, attapulgite, polyamide wax powder or fumed silica; a leveling agent is used to form a smooth and uniform coating film in the film forming process, and examples may include at least one of polyether modified silicone, polyester modified hydroxyl-containing silicone, isocyanate modified silicone, polyacrylate and polymethacrylate; an anti-mildew and anti-algae agent is used to inhibit the growth and reproduction of microorganisms, and can be selected from at least one of pentachlorophenol and sodium salt thereof, tetrachloroisophthalonitrile, o-phenylphenol, 8-hydroxyquinoline, salicylanilide or tetramethylthiuram disulfide; a ultraviolet absorber is used to absorb and isolate the radiation harmful to the polymer, thus prolonging the life of the coating film, and as described here, it can be exemplified by at least one of salicylates, benzophenone or benzotriazole; a film-forming additive is used to help film-forming substances to form films well at low temperature, and examples include at least one of propylene glycol, turpentine, polyethylene glycol, alcohol ester dodecyl or dipropylene glycol butyl ether; a pH regulator is used to adjust the pH value of the emulsion or liquid coating, and examples include at least one of alkanolamines such as 2-amino-2-methyl-1-propanol, N-methyl ethanolamine, dimethyl ethanolamine, monoethanolamine, diethanolamine, triethanolamine, butyl ethanolamine, sodium hydroxide, potassium hydroxide or ammonia water; an emulsifier is used and can be at least one of alkyl sulfonic acid, alkyl benzene sulfonic acid, sodium salt of alkyl phosphoric acid, ammonium salt, polyoxyethylene phenyl ether, polyoxyethylene nonylphenyl ether, polyoxyethylene monolaurate, polyoxyethylene monostearate, polyoxyethylene monooleate, sorbitan monolaurate or sorbitan monostearate; a corrosion inhibitor is used to prevent or slow down the corrosion phenomenon at the contact between metal and coating, and can be at least one of molybdate, tungstate, phosphate, basic sulfonate, zinc salt of organic nitride, diphenylamine, dimethyl ethanolamine or triethanolamine; a drier is used to shorten the drying time of the coating film and improve the strength of the coating film, and can be at least one of cobalt naphthenate, manganese naphthenate, zinc naphthenate, lead naphthenate, calcium naphthenate, cerium naphthenate or zinc ricinoleate; an anti-skinning agent is applied to inhibit the coating from oxidizing and gel forming skinning, and can be at least one of methyl ethyl ketone oxime, butyraldehyde oxime or cyclohexanone oxime; a pigment is used to distinguish it from the primer without pigments, topcoat of the undercoat and top coating, and can be at last one of titanium dioxide, barite, calcium carbonate, CI pigment yellow 42, CI pigment blue 15, CI pigment blue 15:1, CI pigment blue 15:2, CI pigment blue 15:4, CI pigment red 49:1, CI pigment red 57:1, iron red, iron yellow or carbon black; a filler is used to reduce the cost and improve the abrasion resistance, scratch resistance and corrosion resistance of the coating film, and can be at least one of alumina, zinc oxide, carbon black, graphite, calcium carbonate, kaolin, zinc oxide or talcum powder; other unrestricted antioxidants, lubricants, anti-freeze, anti-color separation agents, surfactants, tensioners, moisture absorbents, deodorizers, silane coupling agents, antistatic agents, water repellents, oil repellents, etc. can be used. It should be clear that the use of the above additives is aimed at changing at least one property of the coating, and the selection and amount of additives are well known in the field and should not adversely affect the fire extinguishing agent microcapsules.

Various embodiments are described. Film-forming substances are dispersed in a solvent, and then fire extinguishing agent microcapsules are slowly added and stirred uniformly at a speed not higher than 60 r/min, which can be used for coating. The drying temperature of the coating is not higher than 45° C.

A coating composition including film-forming substances, solvents and fire extinguishing agent microcapsules is provided. The fire extinguishing agent microcapsules have good compatibility with the film-forming substances and solvents, and will not have adverse effects after compounding. The fire extinguishing agent microcapsules are evenly distributed in the coating, and the coating film formed after coating and drying has excellent cooling and/or fire prevention and/or fire extinguishing effects. The fire extinguishing agent microcapsules have high core-wall ratio and high fire extinguishing sensitivity. When the external temperature is higher than the fire extinguishing response temperature or when encountering an open flame environment, the rear wall material is cracked and vaporized to release fire extinguishing materials, and the fire extinguishing materials quickly absorb heat, achieving the purpose of cooling, fire prevention and fire extinguishing.

[Powder Coating]

Provided is a powder coating, which includes a film-forming component as a coating film-forming resin and further includes fire extinguishing agent microcapsules; and
- the fire extinguishing agent microcapsule has at least two layers of wall materials;
- the wall material of the fire extinguishing agent microcapsule is ruptured at not less than 100° C., preferably at 120° C.-150° C.;
- the fire extinguishing agent microcapsule vaporizes to release the microcapsule core fire extinguishing material after the wall material is ruptured.

[Film-Forming Component]

Various embodiments are described, and the film-forming component is a coating film formed by ultraviolet curing as a coating film-forming resin.

Various embodiments are described, and the film-forming components include a photocurable resin and a photoinitiator.

Various embodiments are described, and the photocurable resin is selected from at least one of unsaturated polyacrylate, methacrylate modified polyester, mixture of unsaturated polyester and acrylate, acrylate grafted polyester, acrylated polyacrylate, epoxy resin, epoxy acrylic resin, polyurethane acrylate or hyperbranched polyester acrylic resin.

Various embodiments are described, and the photoinitiator is selected according to the type of the photocurable resin.

Various embodiments are described, and the photoinitiator is selected from at least one of Irgacure™184, 2959 (CIBA), Irgacure™819, Irgacure™651 and Lucerin TPO3.

As the type of the photocurable resin, examples include at least one of UVECOAT®1000, UVECOAT®1016, UVECOAT®1043, UVECOAT®2100, UVECOAT®2200, UVECOAT®2200, UVECOAT®2300, UVECOAT®3000, UVECOAT®3001, UVECOAT®3002, UVECOAT®3003, UVECOAT®3005 from Cytec Industries Inc. that are melt-leveled at not less than 90° C., vinyl ether and fumaric acid unsaturated polyester that are melt-leveled at 100° C., UracrossP3125 and UracrossP3307 that are melt-leveled at not more than 100° C., UracrossP3125 and UracrossP3898 that are melt-leveled at not more than 120° C., VESTAGON® EP-UV100, VESTAGON® EP-UV300 and VESTAGON® EP-UV500 of Degussai Company that are melt-leveled at a temperature not higher than 115° C.

Various embodiments are described, and the film-forming component also includes an auxiliary agent adapted to the photocurable resin and photoinitiator. The auxiliaries are properly applied with the aforementioned auxiliaries. The selection of additives is based on the standard of not affecting the properties of fire extinguishing agent microcapsules.

Various embodiments are described, and the coating powder is melt-leveled at a temperature not higher than the fire-extinguishing response temperature of the wall material of the fire extinguishing agent microcapsule and not lower than the melt-leveling temperature of the film-forming component.

[Fire Extinguishing Agent Microcapsules]

Various embodiments are described, and the fire extinguishing agent microcapsules exist in a powder state and/or in a state of being stored in a storage solvent.

Various embodiments are described, and the weight loss of the fire extinguishing agent microcapsule is not higher than 2% when it is stored in a storage solvent for 6 months.

Various embodiments are described, and the storage solvent is water and/or ethanol.

It should be clear that all the above-mentioned items of fire extinguishing agent microcapsules and their preparation processes are suitable for this powder coating, and the selection and limitation of wall materials and preparation processes of fire extinguishing agent microcapsules, such as but not including selecting appropriate polymer materials, improving the crosslinking degree of polymer materials and increasing the number of layers of wall materials, will help to improve the fire extinguishing response temperature of fire extinguishing agent microcapsules. The fire extinguishing agent microcapsules with wall materials ruptured at not less than 100° C., more preferably at 120° C.-150° C. can be obtained. After compounding the film-forming resin with the fire extinguishing agent microcapsules, the powder coating is melted at a temperature not higher than the fire extinguishing response temperature of the wall materials of the fire extinguishing agent microcapsules and can be melted and leveled, and then a coating film can be formed by ultraviolet curing. The structure of the fire extinguishing agent microcapsules in the obtained coating film remains intact, and the fire extinguishing materials in the contents are not leaked. When the coating film is higher than the fire-extinguishing response temperature of the fire-extinguishing agent microcapsule or meets an open flame, the wall material of the microcapsule is ruptured, and the content fire-extinguishing material is released by vaporization, thereby realizing the functions of cooling and/or fire prevention and/or fire extinguishing. It should be understood that all the film-forming components in powder coatings should and must be compatible with each other. For example, light-curing resin needs to be compatible with photoinitiator, and light-curing resin needs or photoinitiator is not limited to the examples mentioned in this application. Any film-forming component that can form a coating at a temperature not higher than the rupture temperature of fire extinguishing agent microcapsules can be applied to the powder coatings mentioned above.

[Use]

Provided is the use of the powder coating in the preparation of cooling and/or fire-prevention and/or fire-extinguishing coatings.

Various embodiments are described. The coating powder is melt-leveled at a temperature not higher than the fire-extinguishing response temperature of the wall material of the fire-extinguishing agent microcapsule and not lower than the melting temperature of the film-forming components, and is cured by ultraviolet light to prepare a cooling and/or fire-retardant and/or fire-extinguishing coating film.

[Coating]

Provided is a coating film, which is a continuous and/or discontinuous film which is coated or uncoated on the surface of a substrate and formed after drying, and contains a fire extinguishing material.

Various embodiments are described, and the coating film is formed by the environment-friendly fire-retardant coating; and/or formed by the coating composition describe above; and/or formed by the aforementioned powder coating.

Various embodiments are described, and the coating film can vaporize and a release fire-extinguishing material after being exposed to an environment with a temperature not lower than 75° C. and/or an open flame to achieve the purposes of cooling and/or fire prevention and/or fire extinguishing.

Various embodiments are described, and the fire extinguishing material is selected from at least one of perfluorohexanone, perfluorohexane, perfluoroheptane, perfluorooctane, tetrafluoroethylene dibromoethane or trifluorotrichloroethane.

Various embodiments are described, and the fire extinguishing material is perfluorohexanone.

Various embodiments are described, and the fire extinguishing material is wrapped by at least two layers of wall materials and stably exists in the coating film; and the wall material is ruptured after being exposed to a temperature of not less than 75° C. and/or an open flame environment.

Various embodiments are described, and the wall material contains nano silicon oxide and/or nano metal oxide.

Various embodiments are described, and the wall material contains nano silicon oxide and nano metal oxide in a weight ratio of 1:(2.5-5).

Various embodiments are described, and the wall material contains polymer materials.

Various embodiments are described, and the polymer material is selected from at least one of natural polymer, semi-synthetic polymer or synthetic polymer. The natural polymer, semi-synthetic polymer and synthetic polymer are appropriately applied to the corresponding items mentioned above.

Various embodiments are described, and the wall material contains at least one anti-ultraviolet agent of salicylate, benzophenone or benzotriazole. Various items of the anti-ultraviolet agent are appropriately applied to the corresponding items of the anti-ultraviolet agent.

It should be clear that the fire extinguishing material exists in the coating film in the form of the core material of the fire extinguishing agent microcapsule, therefore the above-mentioned items of the fire extinguishing agent microcapsule and its preparation process are appropriately applied to this coating film item. Obviously, the coating film has a fire-extinguishing response temperature as low as 75° C. When the temperature of the coating film rises to 75° C. or above, or when it encounters an open flame environment, the fire-extinguishing material in the coating film is released by vaporization, and the fire-extinguishing material vaporizes and quickly absorbs environmental heat, so that the ambient temperature is instantly reduced to realize automatic cooling and automatic fire prevention, and the temperature of the hot spot or the fire point is reduced to below the flame point temperature, thus realizing the function of automatic fire extinguishing. The coating film is different from the flame-retardant coating film cured by ordinary flame-retardant coatings in that it not only prevents the spread of the ignition point, but also has a predictive fire extinguishing effect in the fire environment caused by temperature rise, which significantly improves the convenience and application range of fire prevention and extinguishing, so it has higher utilization value.

[Coated Article]
Provided is a coated article including
a substrate, and
a coated article
with a coating film formed by the above environmentally-friendly fire-retardant coating; and/or
with a coating film formed by the above coating composition; and/or
with a coating film formed by the above powder coating; and/or
forming the above coating film
on a surface of the substrate.

Various items of the above-mentioned environment-friendly fire-retardant coating and/or coating composition and/or powder coating and/or coating film can be appropriate applied on the coated article.

[Substrate]
Various embodiments are described, and as the substrate, optional examples include at least one of the following:
wood-based materials, including wood-based plates, wood-based profiles, wood-based equipment, wood-based structural parts, etc.;
metal-based substrates, including iron products, stainless steel products, aluminum products, copper products, gold products, silver products, zinc products, tin products, etc.;
cement-based substrates, including cement, lime, gypsum, etc.;
electronic component substrates, including carriers, chip boards, chip cans, batteries, antennas, transistors, etc.;
rubber-based substrates, including natural rubber, isoprene rubber, butadiene rubber, chloroprene rubber, styrene-butadiene rubber, hydrogenated Ding Qing rubber, butyl rubber, nitrile rubber, EPDM rubber, silicone rubber, fluororubber, silicone rubber, rubber compound, etc.;
natural fibers, synthetic fibers and woven or non-woven fabrics including them, glass, ceramics, paper, fiberboard, wallboard, etc.

Various embodiments are described, and the coating film is directly formed on the surface of the substrate continuously or discontinuously; and/or the coating film is continuously or discontinuously formed on the surface of the isolation layer arranged on the surface of the substrate.

Various embodiments are described, and the isolation layer is continuously or discontinuously arranged on the surface of the substrate.

Various embodiments are described, and the isolation layer is a layer formed of at least one of natural polymer, semi-synthetic polymer or synthetic polymer.

Various embodiments are described, and the natural polymer is selected from at least one of gelatin, alginate, Arabic gum, chitosan, chitosan oligosaccharide, xanthan gum, β-cyclodextrin, polyglutamic acid, guar gum or carrageenan.

Various embodiments are described, and the semi-synthetic polymer is selected from at least one of sodium carboxymethyl cellulose, hydroxypropyl methylcellulose, carboxymethyl cellulose, sodium carboxymethyl guar gum, starch octenylsuccinate or low methoxyl pectin.

Various embodiments are described. The synthetic polymer is selected from at least one of polymethacrylate, epoxy resin, polyurethane, polyester resin, amino resin, phenolic resin, acrylic resin, furan resin, resorcinol-formaldehyde resin, xylene-formaldehyde resin, unsaturated polyester, melamine-formaldehyde prepolymer, polyimide or urea-formaldehyde resin.

The substrate used for providing coated articles and applying the environmentally-friendly fire-retardant coating, coating composition, powder coating or coating film mentioned above can be any article suitable for the environmentally-friendly fire-retardant coating, coating composition, powder coating or coating film, and particularly preferred is an article that may be exposed to high heat and/or open flame environment as an unfavorable environment. The purpose is that when the coated article is exposed to high temperature and/or open flame, the coating film in the coated article can be heated and vaporized to release fire extinguishing materials, which can quickly absorb heat to reduce local temperature, thus realizing active cooling and fire extinguishing, greatly reducing the damage caused by the erosion of the substrate by high temperature or open flame, without causing other pollution to the substrate, with extremely high environment-friendly degree, excellent safety performance and high application value.

Various embodiments are described. After a coating film is formed on the surface of a substrate, a polymer substance can be sprayed on the surface of the coating film to form a protective film. After the coating is completed, specific polymer substances can be sprayed on the surface of the coating to form a protective film, which can block air, moisture, prevent aging, prevent acid and alkali fog, resist ultraviolet rays and maintain proper humidity. At the same time, it has a self-repair function under certain conditions. By changing the composition of polymer solution and the thickness of the protective film, the fire-extinguishing response temperature of the coated article can be improved to varying degrees, so that the coating film can adapt to the required cooling and/or fire prevention and/or fire-extinguishing triggering conditions in different application environments and can be flexibly applied.

The polymer materials are usually hydrophobic and film-forming, and have suitable softening point and glass transition temperature, including but not limited to polyester, polyurethane, phenolic resin, urea-formaldehyde resin, polyurea resin, polymer silicon, natural polymer, acrylic resin, epoxy resin, etc. The thickness of that protective film is 10-500 μm, preferably 50-200 μm.

The present disclosure will be described in detail below.

Example 1

The preparation method for an environment-friendly fire-retardant coating includes the following steps.

100 g of a 10% (mass fraction) gelatin aqueous solution was prepared as a wall material solution, 0.002 g of nano-silica powder and 0.01 g of nano-titanium dioxide powder were added, and the mixture was stirred at 60° C. until evenly mixed and dispersed. 80 g of perfluorohexanone was added, stirred at 450 r/min at 25° C. for 40 min, and 3 mL of a 10% (mass fraction) glutaraldehyde solution was slowly added, the mixture was stirred to be crosslinked for 30 min, filtered, washed and separated to obtain about 80 g of preliminarily solidified microcapsules.

Figure 2:
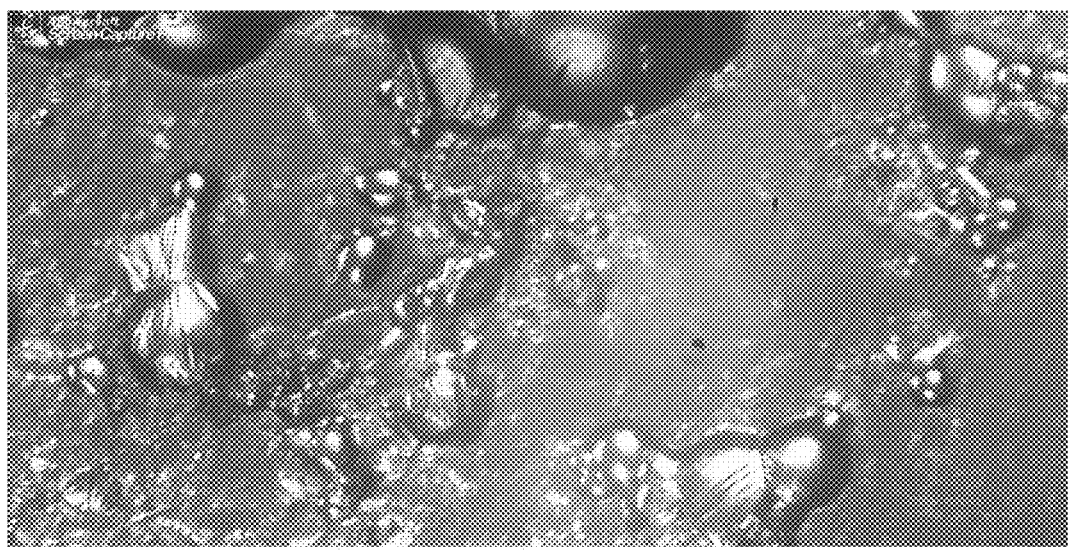
FIG. 2 is a microscopic image showing partial rupture of the fire extinguishing agent microcapsules obtained in Example 1 after drying.

80 g of preliminarily solidified microcapsules was added into 60 g of a melamine-formaldehyde prepolymer solution, and the mixture was stirred for 1 h, filtered, washed and dried at low temperature to obtain fire extinguishing agent microcapsule powder, the microscopic image of which is shown in FIG. 1, and the microscopic image of which after rupturing at high temperature is shown in FIG. 2.

Figure 3:
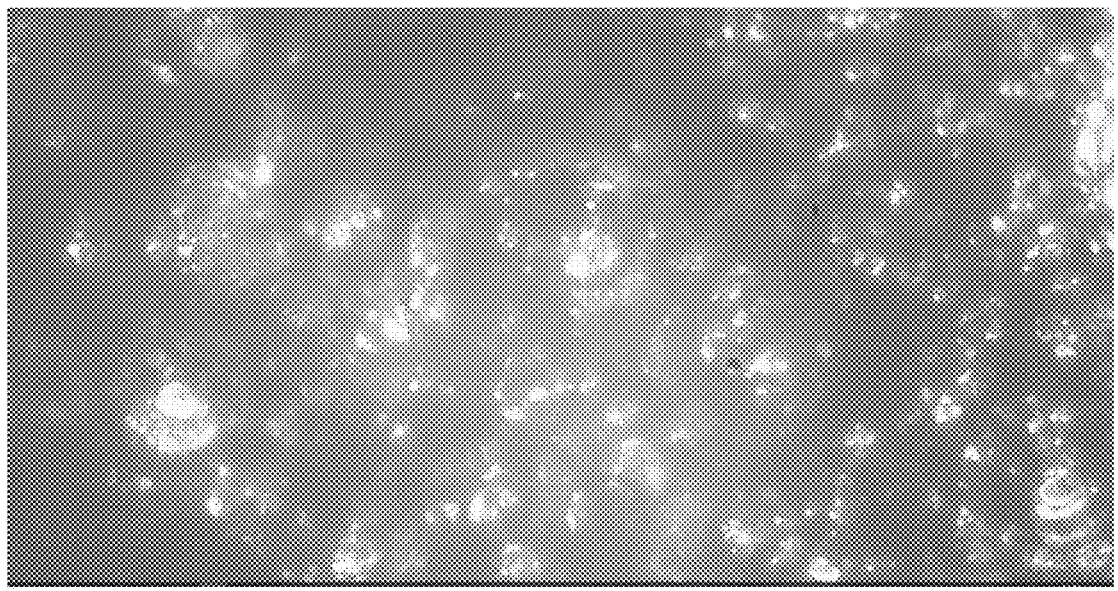
FIG. 3 is a microscopic image showing the fire-retardant coating obtained in Example 1 (the liquid fire extinguishing material is highlighted)
Figure 4:
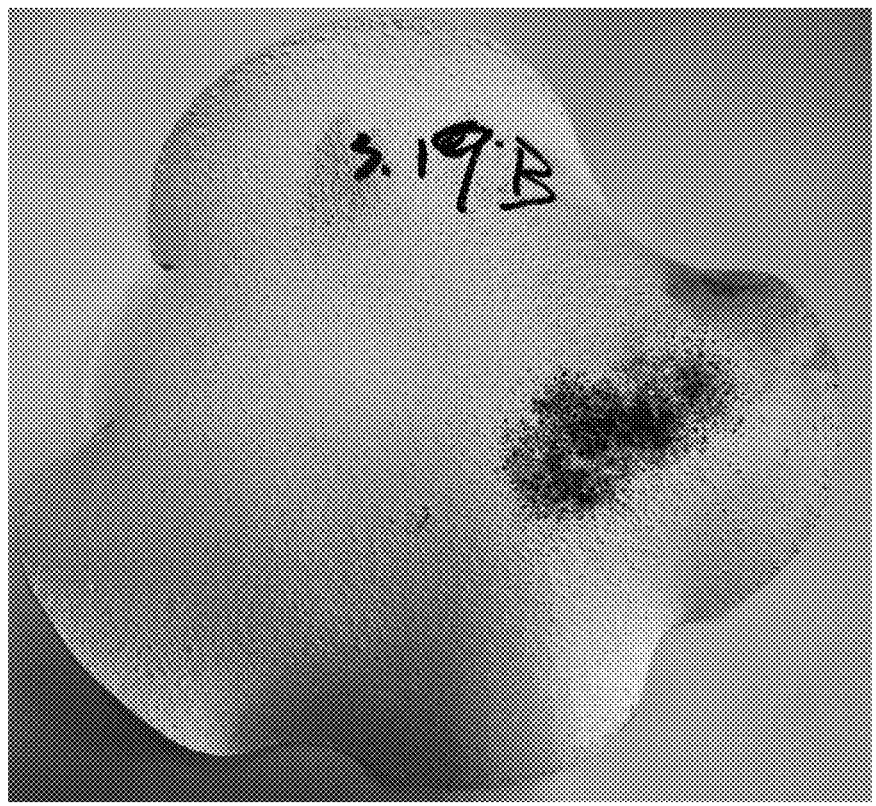
FIGS. 4 and 5 are morphologies showing the fire-retardant coating obtained in Example 1 after construction and drying.
Figure 5:
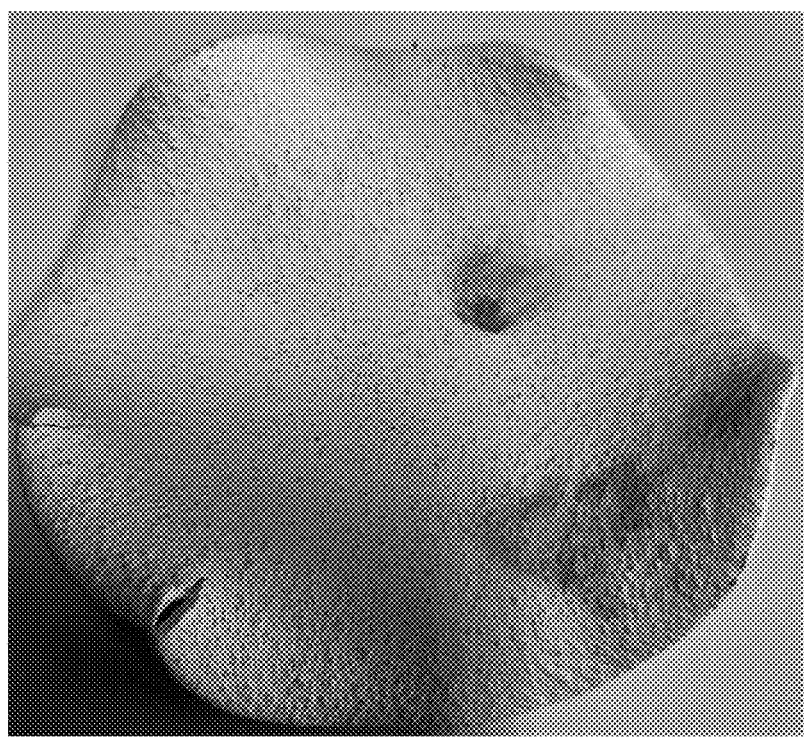
Figure 6:
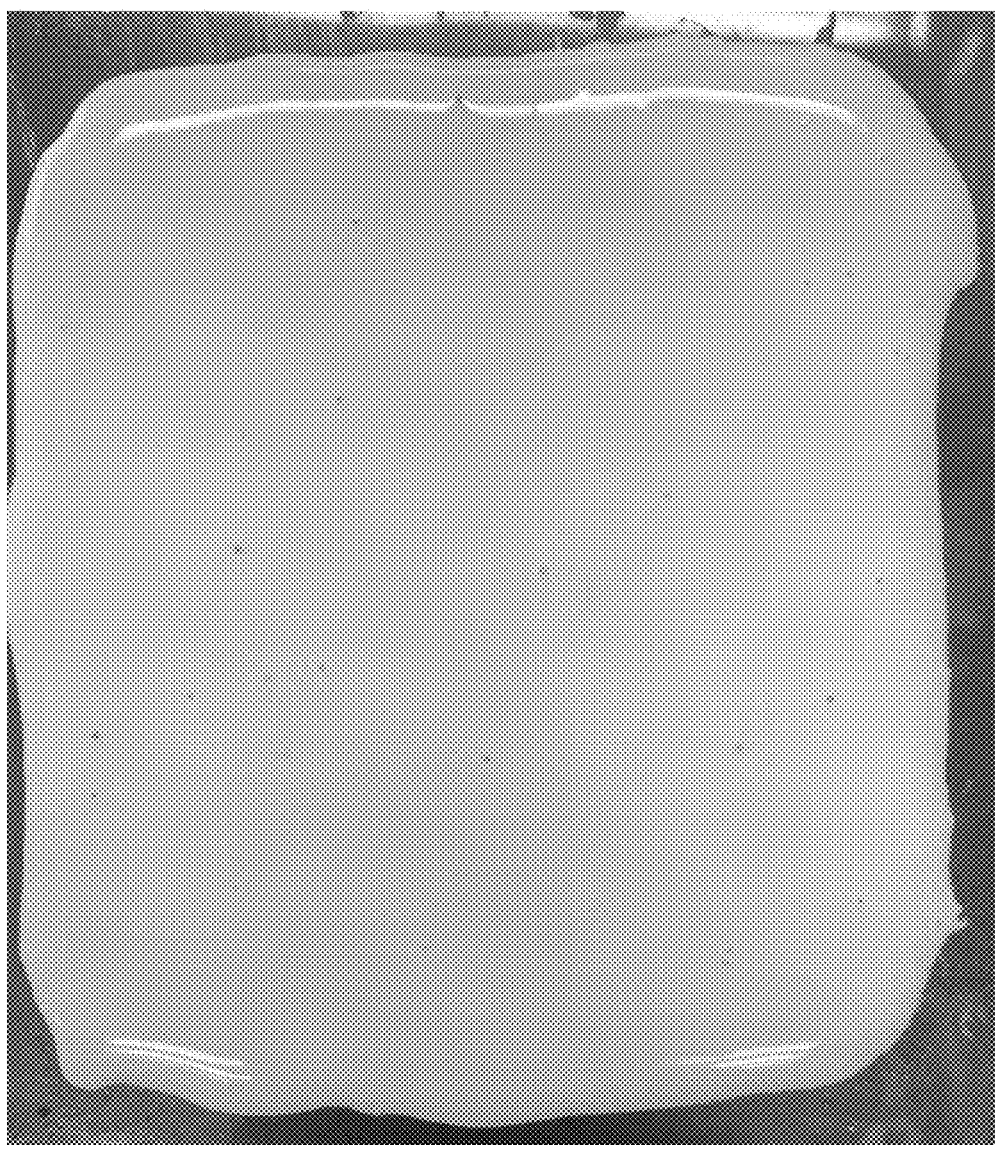
FIG. 6 is a morphology diagram showing the fire-retardant coating obtained in Example 1 when it is not dried after construction.
Figure 7:
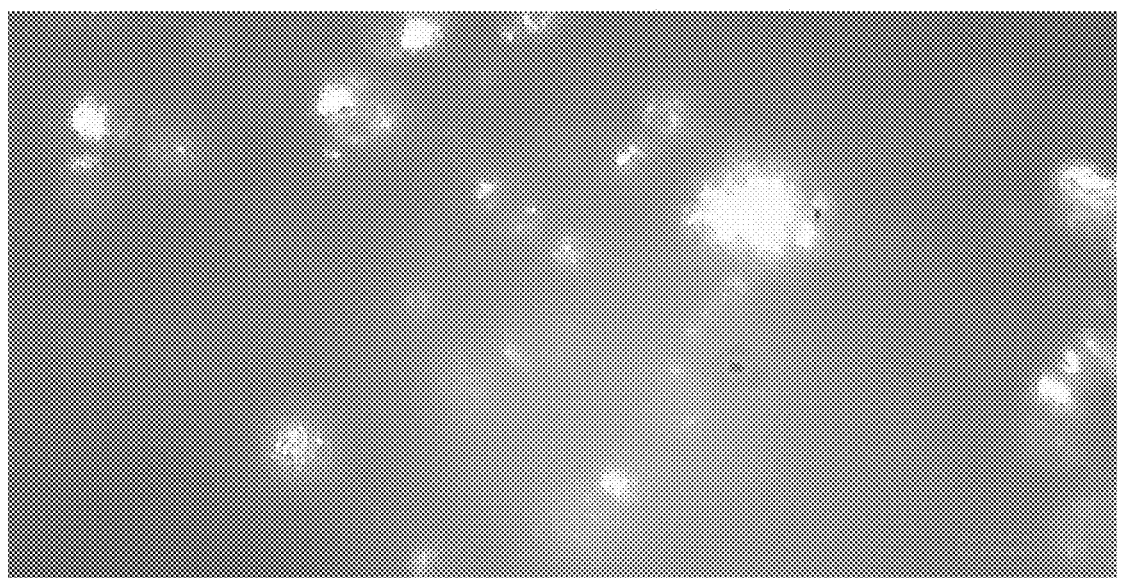
FIG. 7 is a microscopic image showing the fire-retardant coating obtained in Example 2 (the liquid fire extinguishing material is highlighted)

70 g of fire extinguishing agent microcapsule powder was slowly added into 20 g of a polyurethane solution at 30 r/min, and the mixture was stirred and dispersed evenly; then 100 g of water-based latex coating was added at 30 r/min, and the mixture was stirred evenly to obtain a fire-retardant coating, the microscopic image of which is shown in FIG. 3. The above fire-retardant coating was dried, as shown in FIGS. 4-5. In addition, the fire-extinguishing coating was coated on the surface of the substrate and dried, and then a 50 μm polyurea protective layer was coated on the surface of the fire-extinguishing coating, as shown in FIG. 6, and dried.

Example 2

The preparation method of a fire-retardant coating includes the following steps.

100 g of a 15% (mass fraction) gelatin aqueous solution was prepared as a wall material solution, 0.004 g of nano-silica powder and 0.016 g of nano-titanium dioxide powder were added, and the mixture was stirred at 20° C. until evenly mixed and dispersed. 75 g of perfluorohexanone was added, stirred at 900 r/min at 15° C. for 1 h, and 2 mL of a 10% (mass fraction) glutaraldehyde solution was slowly added, the mixture was stirred to be crosslinked for 45 min, filtered, washed and separated to obtain about 82 g of preliminarily solidified microcapsules.

80 g of preliminarily solidified microcapsules was added into 60 g of a melamine-formaldehyde prepolymer solution, and the mixture was stirred for 1 h, filtered, washed and dried at low temperature to obtain fire extinguishing agent microcapsule powder.

70 g of fire extinguishing agent microcapsule powder was slowly added into 20 g of a polyurethane solution at 30 r/min, and the mixture was stirred and dispersed evenly; then 100 g of water-based latex coating was added at 30 r/min, and the mixture was stirred evenly to obtain a fire-retardant coating, the microscopic image of which is shown in FIG. 4. The above fire-retardant coating was dried, and then a 50 μm polyurea protective layer was coated on the surface of the coating and dried.

Verification Example 1

Figure 8:
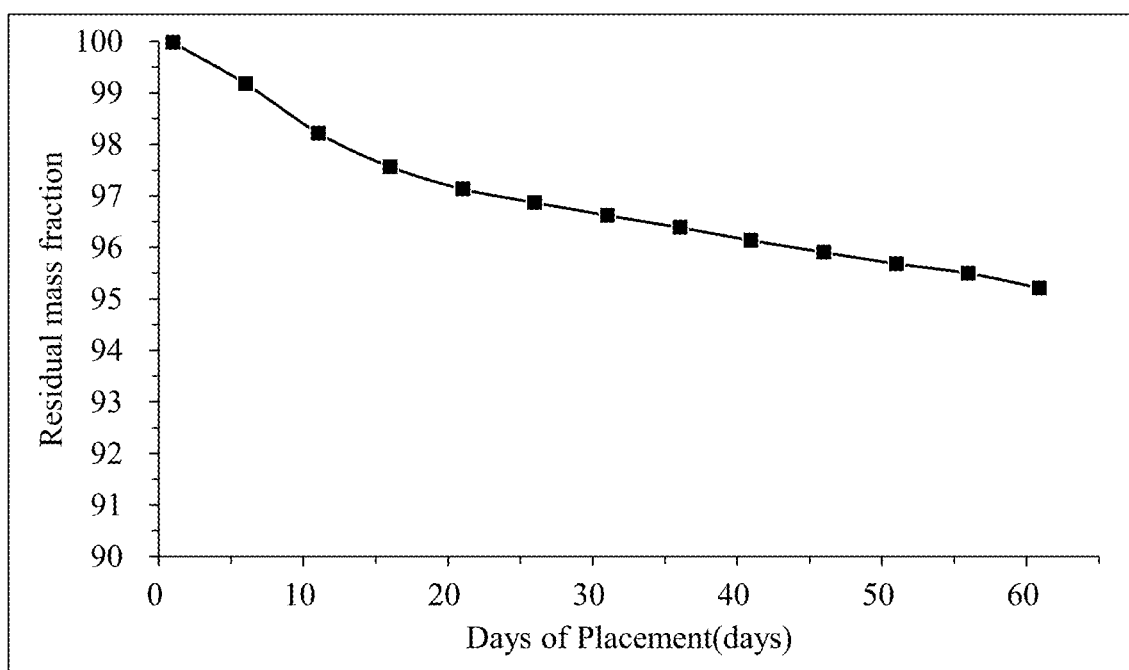
FIG. 8 is a schematic diagram showing the weight loss of the coating sample obtained in Example 1 without coating a protective layer at room temperature.

The dry coating sample without polyurea protective layer obtained in Example 1 was allowed to stand at room temperature (a temperature of 25° C.±2° C., a relative humidity of 60% 5%) to verify the weight loss of the fire-retardant coating. The results are shown in FIG. 8. In FIG. 8, the quality changes in the early stage include the volatilization of a little residual water in the coating and the rupture of microcapsules. With the loss of water, the weight loss will slowed down in the later stage, especially after 20 days, indicating that the fire extinguishing agent microcapsules exist stably in the coating. After standing in the indoor environment for 2 months, the residual dry weight was about 95%, which shows good storage stability, indicating that the fire extinguishing agent microcapsules do not rupture continuously with the extension of standing time, which is beneficial to the retention of fire extinguishing materials and the maintenance of fire extinguishing performance in microcapsules.

Verification Example 2

Figure 9:
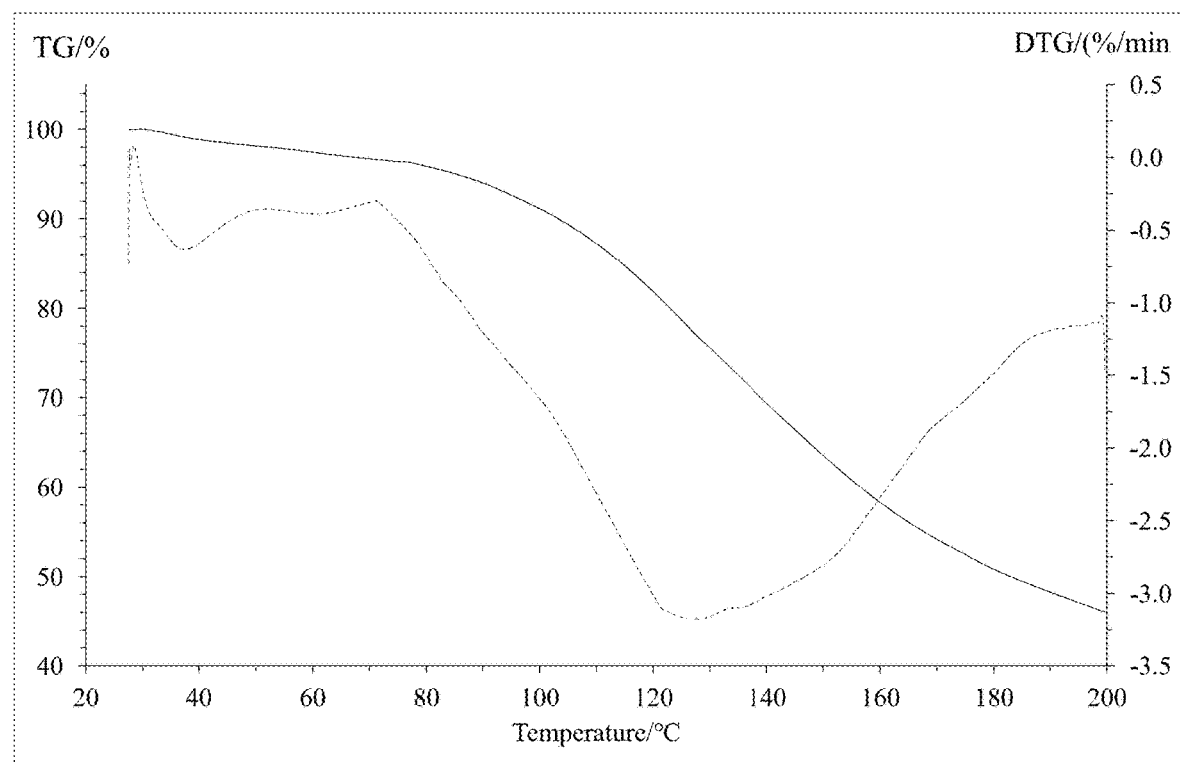
FIG. 9 is a thermogravimetric analysis curve of the dry matter of the fire-extinguishing coating obtained in Example 1.

The fire-extinguishing coating (dry) obtained in Example 1 of the present disclosure was subjected to thermogravimetric analysis, and a thermogravimetric analysis curve as shown in FIG. 9 was obtained, in which the fire-extinguishing response temperature was about 75° C., and the fire-extinguishing material began to be released obviously after 80° C. At the stage of 40-75° C., a small part of the microcapsules were ruptured by heat, and when the temperature reached 80° C., the walls of the microcapsules began to be ruptured obviously, and the contents leaked significantly, indicating that the fire-extinguishing material was quickly vaporized and released in the coating. It can also be seen from FIG. 9 that the dry weight loss of the fire-extinguishing coating is 28.85% in the range of about 99° C. to about 163° C., which indicates that the microcapsules of the fire-extinguishing agent are not completely ruptured during the first heating process, reflecting the repeatability of the fire-extinguishing performance of the fire-extinguishing coating. It should be noted that the thermogravimetric analysis process is programmed temperature rise, and the microcapsules will not be completely ruptured, therefore the weightless mass is not equal to the actual perfluorohexanone content.

Verification Example 3

A method for verifying the fire prevention and/or fire extinguishing effect of fire prevention and/or fire extinguishing sheets, such as fire-extinguishing coatings, is provided, which comprises the following steps: a flame of about 800° C. was taken as a fire source, the temperature was measured with an infrared thermometer, the fire extinguishing time was measured with a stopwatch, the sheet was fixed on the surface of a stamped steel plate, the sheet was placed facing down at a position 1.5 cm away from the outer flame, the fire extinguishing time and the temperature difference before and after fire extinguishing on the upper part of the sheet were measured, and the fire prevention and/or fire extinguishing effect was represented by the fire extinguishing time and temperature difference.

Figure 10:
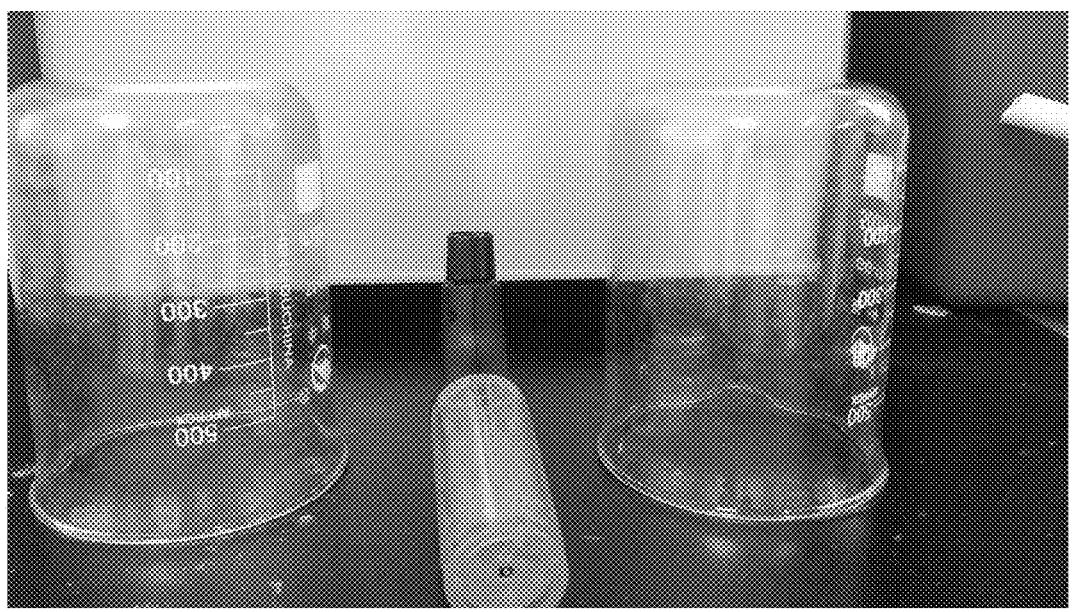
FIG. 10 is a schematic diagram of the fire extinguishing verification device.
Figure 11:
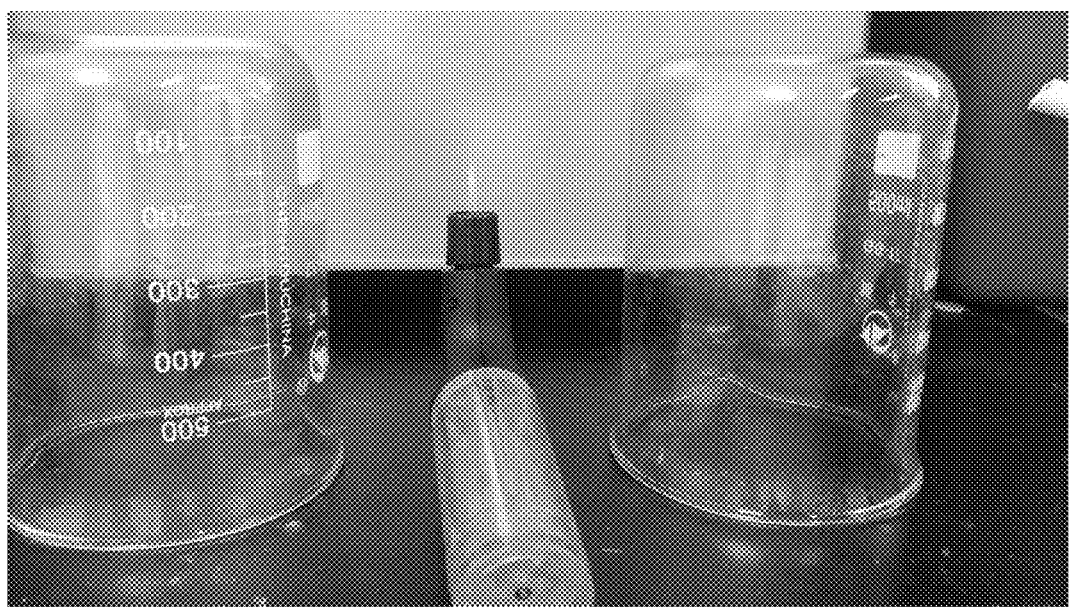
FIG. 11 is a schematic diagram of the ignition state of the fire extinguishing verification device.
Figure 12:
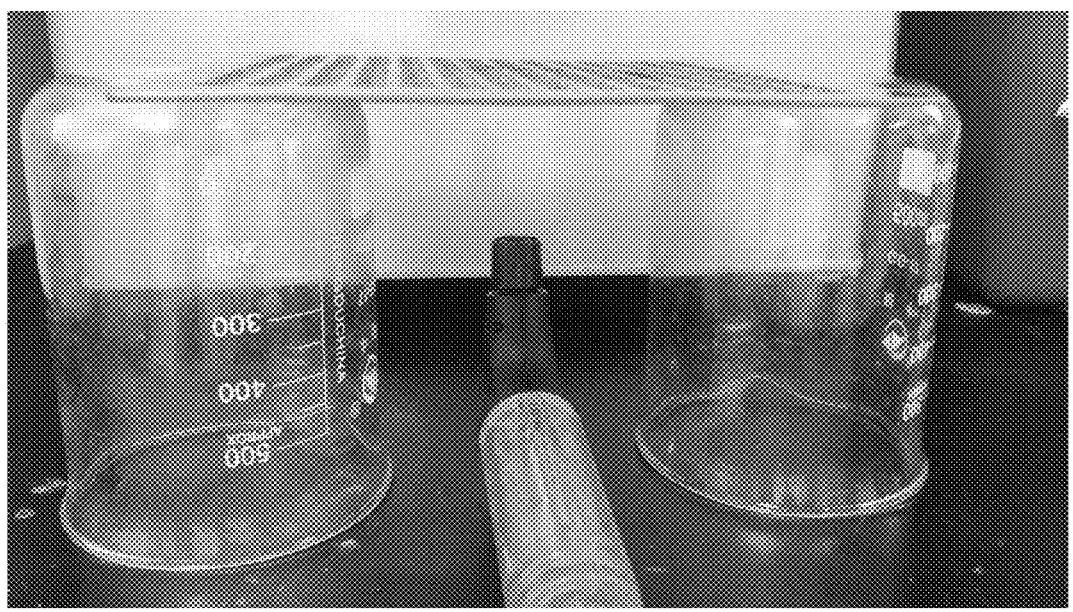
FIG. 12 is a schematic diagram of the fire extinguishing verification device simulating the state of placing samples.

Based on the above method, the fire extinguishing time of the coating films obtained in Examples 1 and 2 was verified. A layer of double-sided tape was stuck on the back of the coating film to facilitate the ignition test. The coating film was placed at a position about 1.5 cm away from the outer flame. The test device was shown in FIGS. 10-12, and the flame size and temperature were fixed. The coating film was attached to the punched steel plate, and the flame temperature was about 800° C. Two or three points were selected to test the fire response time, and the results are shown in Table 1.

TABLE 1

| Fire Extinguishing Time | | | | | | |
| --- | --- | --- | --- | --- | --- | --- |
| | | Fire extinguishing time | | | | |
| Fire-retardant coating | Site | First time | Second time | Third time | Fourth time | Fifth time |
| Sample 1 | 1-1 | 2"51 | 2"78 | 2"99 | 3"56 | / |
| | 1-2 | 1"72 | 2"95 | 3"45 | 4"45 | 5"74 |
| | 1-3 | 2"48 | 2"51 | 3"94 | 5"21 | / |
| Sample 2 | 2-1 | 2"20 | 1"93 | 2"82 | 4"53 | 5"61 |
| | 2-2 | 2"17 | 2"35 | 3"20 | 4"94 | / |

Note:
"/"means that the fire extinguishment is not completed within 7 s.

As can be seen from Table 1, the coatings prepared in Example 1 and Example 2 of this application can all complete fire extinguishment within 3 s without melting drop of the coating film, and the fire can be extinguished for 4-5 times at the same test point. When exposed to open fire, the surface layer of microcapsules in the coating component softens, ruptures and releases perfluorohexanone, which automatically triggers the fire extinguishing function. The addition of nano-oxide in the fire extinguishing agent microcapsules is helpful to quickly absorb the hydrolysate of fire extinguishing materials, reduce the residue of hydrolysate and avoid its corrosion to the wall materials of unbroken microcapsules, maintain the inherent form of microcapsules, improve the reusability of coatings, and greatly expand the application field of fire extinguishing agent microcapsules.

Example 3

The preparation method of a fire-retardant coating includes the following steps.

100 g of wall material solution was prepared, including 12.5 g of gelatin, 0.01 g of hexyl salicylate, 0.015 g of nano-silica powder and 0.005 g of nano-zinc oxide powder, and stirred at 60° C. until evenly mixed and dispersed; 90 g of perfluorohexanone was added and stirred at 35° C. for 60 min at a speed of 2000 r/min; at this time, microcapsule emulsion with gelatin as a wall material and perfluorohexanone embedded was formed; 3 mL of 20% glutaraldehyde was added and stirred for 30 min; after the reaction, the microcapsules were separated by filtration and washed twice with deionized water to obtain 90 g of a preliminary product of microcapsules.

90 g of the preliminary product of microcapsules was added into 100 g of resorcinol-formaldehyde resin prepolymer solution, stirred for 2 h, filtered, washed and dried at low temperature, thus obtaining fire extinguishing agent microcapsule powder. The powder of fire extinguishing agent microcapsule was about 85 g.

85 g of the fire extinguishing agent microcapsule powder was added into 90 g of melamine-formaldehyde resin emulsion; the mixture was stirred for 10 min at 30 r/min, poured into a mold, dried and molded at 40° C., and a layer of polyurea of about 50 μm was scraped on the surface, and dried at 40° C. to obtain a coating film with a thickness of about 1 mm.

Verification Example 4

Based on the method described in Verification Example 3, the fire extinguishing time and temperature changes before and after fire extinguishing of the coating film obtained in Example 3 were verified. A layer of double-sided tape was stuck on the back of the coating film to facilitate the ignition test. The temperatures of the back of the coating film before and after fire extinguishing was measured by Bosch infrared thermometer GIS 500, and the temperature was measured at a distance of 10 cm from the coating film. The coating film was placed at about 1.5 cm outside the flame, and the sample was stuck on the punched steel plate. The minimum flame was selected, and the flame temperature was about 800° C. Because the equipment can only measure the temperature within 500° C. and needs to be away from the sample by a certain distance, it can only measure the temperature at 10 cm away from the sample or flame, and the display in the high temperature section will be low. At the same time, PYCINTEX fire-extinguishing stickers from Russia were selected for comparison.

This patent sample was tested at 10 sites, and the results are shown in

TABLE 2

Table 2, Fire Extinguishing Time and Temperature Changes

| Coating sample | Fire extinguishing time | Temperature change |
| --- | --- | --- |
| Site 1 | 2"31 | Before ignition, it was about |
| Site 2 | 2"33 | 26° C., and after ignition, the |
| Site 3 | 1"28 | temperature gradually |
| Site 4 | 2"90 | increased from ignition to |
| Site 5 | 1"76 | fire extinguishing stage, but |
| Site 6 | 2"66 | it did not exceed 40° C. |
| Site 7 | 1"63 | |
| Site 8 | 1"93 | |
| Site 9 | 2"35 | |
| Site 10 | 0"57 | |
| PYCINTEX fire-extinguishing paste | Unable to put out the fire | After 7 s, the sample burned and the temperature rose to 130° C. |

As can be seen from Table 2, all the coated samples in this application can extinguish fire within 3 s, and the temperature only rises slightly during the fire extinguishing process, and the highest temperature does not exceed 40° C., which indicates that the coated film can quickly extinguish the open flame, and the temperature at the fire extinguishing site only rises slightly, and the active fire extinguishing performance is excellent, which can better protect the articles to be coated by the coated film. Through comparative analysis, it can be seen that the Russian PYCINTEX fire-extinguishing paste cannot complete the active fire extinguishing, and the sample burns after 7 s, and the back temperature rises to 130° C., so it cannot play the role of fire prevention and fire extinguishing.

Example 4

Provided is a powder coating, which includes fire extinguishing agent microcapsules and film-forming components, wherein Fire extinguishing agent microcapsules: 100 g of an aqueous solution of the wall material was prepared, including 15 g gelatin, 5 g sodium carboxymethylcellulose, 0.015 g nano silica powder, and 0.005 g nano calcium dioxide powder, and stirred at 30° C. until evenly mixed and dispersed; 90 g of perfluorohexanone was added, the mixture was stirred and emulsified for 1 h at 15° C. at a speed of 2400 r/min to form microcapsule emulsion;

3 mL of 15% formaldehyde solution was slowly added, and the mixture was stirred and crosslinked for 60 min, filtered, washed and separated to obtain about 100 g of preliminarily solidified microcapsules; 40 g resorcinol-formaldehyde resin solution (10%) was slowly added to 100 g of the preliminarily solidified microcapsules, then 5 mL of formaldehyde solution with 15% mass fraction was added, and the mixture was stirred for 1 h, filtered, washed and dried at a low temperature to obtain microcapsule powder; 80 g of microcapsule powder was slowly added to 60 g1% of 1% sodium carboxymethyl cellulose solution, and the mixture was stirred for 1 h, filtered, washed and dried at a low temperature to obtain microcapsule powder with a particle size of about 50-80 μm.

Film-forming components: 70% UracrossP3125, 20% UracrossP3307, 5% Lucerin TPO3(Ciba Geigy), 3.5% Irgacure™651 and 1.5% Resiflow P67 (Estron); melt extrusion at 83° C., air cooling, pulverizing, adding 0.2% alumina C6, and pulverizing to a 150-mesh sieve;

The fire extinguishing agent microcapsules and film-forming components were mixed according to a ratio of 1:5 to obtain the powder coating.

The powder coating was sprayed on the surface of the preheated substrate with a corona discharge spray gun, melted at 100° C. in a convection oven, then melted and leveled at 95° C. for 5 minutes, and finally irradiated by a 600WV-lamp (400-420 nm) at a speed of 1 cm/s for 20 s to obtain a coating film with a thickness of about 0.6 mm.

Verification Example 5

The fire extinguishing time of the coating film obtained in Example 4 and the temperature change before and after fire extinguishing were verified according to the method of Verification Example 3. The samples of this patent were tested at 10 sites, and the results are shown in Table 3.

TABLE 3

Fire Extinguishing Time and Temperature Changes

| Coating sample | Fire extinguishing time | Temperature change |
| --- | --- | --- |
| Site 1 | 3"58 | Before ignition, it was about |
| Site 2 | 4"04 | 28° C., and after ignition, the |
| Site 3 | 4"70 | temperature gradually |
| Site 4 | 3"05 | increased from ignition to |
| Site 5 | 4"42 | fire extinguishing stage, but |
| Site 6 | 3"98 | it did not exceed 60° C. |
| Site 7 | 3"75 | |
| Site 8 | 4"13 | |
| Site 9 | 4"22 | |
| Site 10 | 3"71 | |
| PYCINTEX fire-extinguishing paste | Unable to put out the fire | After 7 s, the sample burned and the temperature rose to 130° C. |

From Table 3, it can be seen that perfluorohexanone is coated with three layers of wall materials to form fire extinguishing agent microcapsules, and then compounded with film-forming components to form powder coatings. After curing, the coating film has a fire extinguishing time of no more than 5 s, and the temperature rises slightly to no more than 60° C. during the fire extinguishing process, indicating that the light-cured coating film can quickly extinguish the open flame, has excellent active fire extinguishing performance, and the heat transfer efficiency of the coating film is low, which is beneficial to protecting the articles coated with the coating film. Russia's PYCINTEX fire-extinguishing paste cannot complete active fire extinguishing, and cannot play the role of fire prevention and fire extinguishing.

Example 5

The preparation method of the fire-retardant coating film was basically the same as that of Example 2, except that 0.02 g of nano calcium dioxide powder was added instead of nano silicon dioxide powder when the microcapsules were initially solidified, and the fire-retardant coating film was obtained according to other parameters and steps the same as that of Example 2.

Example 6

The preparation method of the fire-retardant coating film was basically the same as that of Example 2, except that 0.02 g of nano-silica powder was added instead of nano-calcium dioxide powder when the microcapsules were initially solidified, and the fire-retardant coating film was obtained according to other parameters and steps the same as that of Example 2.

Example 7

The preparation method of the fire-retardant coating film was basically the same as that in Example 2, except that nano calcium dioxide powder and nano silicon dioxide powder are not added when the microcapsules are initially cured, and the fire-retardant coating film is obtained according to other parameters and steps the same as in Example 2.

Example 8

The preparation method of fire-retardant coating film was basically the same as that of Example 2, except that the weight ratio of nano-silica powder and nano-calcium oxide powder is different from that of Example 2 when microcapsules are initially cured. A series of coating films were obtained according to the weight ratio of nano-silica powder and nano-calcium oxide powder, and the weight ratios were 2:1, 1:1, 1:2, 5:1, 7:1 and 9:1 respectively.

Verification Example 6

According to the method of Verification Example 3, the fire extinguishing time of the coating films obtained in Examples 5-8 (respectively labeled as Sample 5, Sample 6, Sample 7 and Sample Group 8) was verified, and 1-3 points of each sample were selected for repeated testing. The results are shown in Table 4.

TABLE 4

Fire Extinguishing Time

| Fire-retardant coating | | First time | Second time | Third time | Fourth time | Fifth time |
|---|---|---|---|---|---|---|
| Sample 2 | 2-1 | 2"20 | 1"93 | 2"82 | 4"53 | 5"61 |
| (site) | 2-2 | 2"17 | 2"35 | 3"20 | 4"94 | / |
| Sample 5 | 5-1 | 2"47 | 2"62 | 4"28 | 6"92 | / |
| (site) | 5-2 | 2"18 | 2"90 | 4"89 | / | // |
| Sample 6 | 6-1 | 1"84 | 2"51 | 4"36 | 6"71 | / |
| (site) | 6-2 | 2"36 | 3"85 | 4"73 | 6"52 | / |
|  | 6-3 | 2"03 | 3"49 | 5"45 | / | // |
| Sample 7 | 7-1 | 2"85 | 5"12 | / | // | // |
| (site) | 7-2 | 3"00 | 4"57 | 6"88 | / | // |
|  | 2:1 | 2"25 | 4"27 | 6"14 | / | // |
|  | 1:1 | 1"97 | 3"84 | 5"67 | / | // |
| Sample | 1:2 | 2"49 | 3"22 | 3"01 | 5"36 | 6"87 |
| group 8 | 5:1 | 1"21 | 4"23 | 4"62 | 5"83 | / |
| (ratio) | 7:1 | 1"74 | 4"90 | 6"45 | / | // |
|  | 9:1 | 2"52 | 4"51 | 6"99 | / | // |

Note:
"/" means that the fire extinguishing is not completed within 7 s, and "//" means that the previous result was "/", and the test was not conducted this time.

In Table 4, samples 5 and 6 were unable to extinguish the fire at several sites during the fourth fire extinguishing, while sample 7 was significantly reduced in the third fire extinguishing effect, indicating that the fire extinguishing effect was reduced to different degrees compared with sample 2. Similarly, many samples in sample group 8 were also unable to extinguish the fire for the fourth or even the third time. The results show that when nano-silica and nano-metal oxide are not added at the same time, it is not conducive to the repeated and long-term performance of fire extinguishment. Moreover, by comparing the data of various samples in sample group 8 with those in Examples 1 and 2 and the repeated verification of the weight ratio of nano-silica and nano-metal oxide, it is known that when the weight ratio of nano-silica and nano-metal oxide is 1:2.5-5 or even 1:2-5, it can play an excellent repeated fire extinguishment role, and it is of positive significance to the storage stability in its conventional application environment.

The conventional techniques in the above embodiments are known to those skilled in the art, so they are not detailed here.

The specific embodiments described herein are only illustrative of the spirit of the present disclosure. Those skilled in the technical field to which the present disclosure belongs can make various modifications or supplements to the described specific embodiments or substitute them in a similar way, but they will not deviate from the spirit of the present disclosure or go beyond the scope defined in the appended claims.

Matters not mentioned in the present disclosure are all known in the art.

What is claimed is:
1. An environment-friendly fire-retardant coating, comprising:
a coating substrate; and
a fire extinguishing agent microcapsule that is ruptured and vaporized to a release fire-extinguishing material to achieve purposes of cooling and/or fire prevention and/or fire extinguishment upon being exposed to a temperature of not less than 75° C. and/or an open flame environment;
wherein a mass fraction of the fire-extinguishing microcapsule in the environment-friendly fire-retardant coating is 40%-70%;
a core-wall ratio of the fire extinguishing agent microcapsule is in a range of 1:1 to 9:1;
a particle size of the fire extinguishing agent microcapsule is 20-400 μm;
the fire extinguishing agent microcapsule comprises:
a core material that vaporizes and absorbs heat when released by heat; and at least two layers of wall materials containing a polymer material;

the at least two layers of wall materials are capable of being ruptured at a temperature not lower than 75° C.;

the at least two layers of wall materials contain a nano silicon oxide and a nano metal oxide with a weight ratio of 1:(2.5-5);

a total amount of the nano silicon dioxide and the nano metal oxide is 0.05%-0.2% of a dry weight of the at least two layers of wall materials; and the core material is at least one selected from a group consisting of perfluorohexanone, perfluorohexane, perfluoroheptane, perfluorooctane, dibromotetrafluoroethane and trichlorotrifluoroethane.

2. The environment-friendly fire-retardant coating according to claim 1, wherein, for the polymer material, a softening point before cross-linking is 30-100° C. and a softening point after cross-linking is 75-150° C.;

an air permeability after cross-linking is ≤700 ml/(cm$^2$·h);

a shrinkage after cross-linking is ≤5%;

a water absorption rate after cross-linking is ≤5%; and a tensile strength after cross-linking is ≥10 MPa.

3. The environment-friendly fire-retardant coating according to claim 1, wherein, the polymer material is at least one selected from a group consisting of natural polymer, semi-synthetic polymer and synthetic polymer.

4. The environment-friendly fire-retardant coating according to claim 3, wherein, the natural polymer is at least one selected from a group consisting of gelatin, alginate, Arabic gum, chitosan, chitosan oligosaccharide, xanthan gum, β-cyclodextrin, polyglutamic acid, guar gum and carrageenan;

the semi-synthetic polymer is at least one selected from a group consisting of sodium carboxymethyl cellulose, hydroxypropyl methyl cellulose, carboxymethyl cellulose, sodium carboxymethyl guar gum, starch octenylsuccinate and low methoxyl pectin; and the synthetic polymer is at least one selected from a group consisting of epoxy resin, polyurethane, polyester resin, amino resin, phenolic resin, acrylic resin, furan resin, resorcinol-formaldehyde resin, xylene-formaldehyde resin, unsaturated polyester, melamine-formaldehyde prepolymer, polyimide and urea-formaldehyde resin.

5. The environment-friendly fire-retardant coating according to claim 1, wherein, the at least two layers of wall materials contain at least one anti-ultraviolet agent of salicylates, benzophenone or benzotriazole.

6. The environment-friendly fire-retardant coating according to claim 5, wherein, the salicylate is at least one selected from a group consisting of benzyl salicylate, hexyl salicylate, ethylhexyl salicylate, phenyl salicylate, octyl salicylate, dicyclohexyl salicylate and isohexadecyl salicylate;

the benzophenone is at least one selected from a group consisting of 2-hydroxy-4-methoxy benzophenone, 2-hydroxy-4-n-octyloxy benzophenone and 2-hydroxy-4-dodecyloxy benzophenone; and the benzotriazole is at least one selected from a group consisting of UV-326, UV-327, UV-328, UV-329, UV-P and UV-5411.

7. The environment-friendly fire-retardant coating according to claim 1, wherein, the nano metal oxide is at least one selected from a group consisting of nano zinc oxide, nano titanium oxide, nano calcium oxide, nano manganese dioxide, nano nickel oxide and nano copper oxide.

8. The environment-friendly fire-retardant coating according to claim 1, wherein, the coating substrate is capable of forming a film with a certain strength.

9. The environment-friendly fire-retardant coating according to claim 1, wherein, after being coated and dried, a smoldering time of the environment-friendly fire-retardant coating is 0s, an afterburning time is 0s, and there is no melting drop;

after being coated and dried, a weight loss rate of the environmentally-friendly fire-retardant coating is ≤5% in a 60° C. blast drying oven for 8 hours.

10. A method for preparing the environment-friendly fire-retardant coating according to claim 1, comprising: compounding the coating substrate with the fire extinguishing agent microcapsule and optionally added auxiliary agents, and uniformly stirring at a speed not higher than 60 r/min to obtain the coating.

* * * * *